United States Patent
Hiratsuka et al.

(10) Patent No.: US 8,570,462 B2
(45) Date of Patent: Oct. 29, 2013

(54) POLARIZATION ELEMENT, METHOD FOR MANUFACTURING THE SAME, AND LIQUID CRYSTAL DISPLAY DEVICE

(75) Inventors: Takato Hiratsuka, Mito (JP); Masaya Adachi, Hitachi (JP); Miharu Otani, Yokohama (JP); Jun Tanaka, Kawasaki (JP); Chie Yoshizawa, Yokohama (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 718 days.

(21) Appl. No.: 12/759,086

(22) Filed: Apr. 13, 2010

(65) Prior Publication Data

US 2010/0259708 A1   Oct. 14, 2010

(30) Foreign Application Priority Data

Apr. 14, 2009   (JP) ................. 2009-098495

(51) Int. Cl.
 *G02F 1/13* (2006.01)
 *G02F 1/1335* (2006.01)
 *G02F 1/1347* (2006.01)

(52) U.S. Cl.
 USPC .......... 349/96; 349/74; 349/97; 349/187

(58) Field of Classification Search
 USPC ................... 349/74, 96, 97, 187
 See application file for complete search history.

(56) References Cited

U.S. PATENT DOCUMENTS

2003/0184862 A1* 10/2003 Sahouani et al. ............. 359/490
2006/0066788 A1   3/2006 Utsumi et al.
2006/0103781 A1   5/2006 Jeng et al.
2006/0268198 A1  11/2006 Utsumi
2007/0002211 A1   1/2007 Sasaki et al.
2007/0200977 A1*  8/2007 Egi et al. .......................... 349/96
2008/0088759 A1   4/2008 Utsumi et al.

(Continued)

FOREIGN PATENT DOCUMENTS

JP   2003-344653   12/2003
JP   2006-091393    4/2006

(Continued)

OTHER PUBLICATIONS

Y. Ukai et al.; 38.1: Invited Paper: Current Status and Future Prospect of In-Cell Polarizer Technology; SID 04 Digest, May 2004, pp. 1170-1173, vol. 35, Issue 1.

(Continued)

*Primary Examiner* — Mark Robinson
*Assistant Examiner* — Jerry Blevins
(74) *Attorney, Agent, or Firm* — Antonelli, Terry, Stout & Kraus, LLP.

(57) ABSTRACT

Provided is a liquid crystal display device including: a liquid crystal cell (15) including a first substrate (110), a second substrate (111), and a liquid crystal layer (160) sealed between the first substrate and the second substrate; a first polarization member (210) for transmitting light in a predetermined polarization direction; and a second polarization member (220) for transmitting light in another polarization direction which is orthogonal to the predetermined polarization direction. At least one of the first polarization member and the second polarization member includes a multilayer thin film polarizer including a plurality of thin film polarizers which are stacked so that transmission axes of the plurality of thin film polarizers are aligned. The multilayer thin film polarizer includes a thin film polarizer formed in a predetermined film thickness by coating with dye molecules which are aligned by a shear stress.

12 Claims, 16 Drawing Sheets

(56) References Cited

U.S. PATENT DOCUMENTS

| | | |
|---|---|---|
| 2008/0143939 A1 | 6/2008 | Adachi et al. |
| 2008/0204647 A1 | 8/2008 | Matsui et al. |
| 2008/0239210 A1 | 10/2008 | Araki et al. |
| 2009/0153781 A1 | 6/2009 | Otani et al. |
| 2009/0225260 A1 | 9/2009 | Adachi et al. |
| 2010/0002173 A1 | 1/2010 | Otani et al. |
| 2010/0238377 A1 | 9/2010 | Sasaki et al. |

FOREIGN PATENT DOCUMENTS

| | | |
|---|---|---|
| JP | 2006-146116 | 6/2006 |
| JP | 2006-330215 | 12/2006 |
| JP | 2007-41534 | 2/2007 |
| JP | 2008-089966 | 4/2008 |
| JP | 2008-209456 | 9/2008 |
| JP | 2008-268778 | 11/2008 |
| JP | 2010-15019 | 1/2010 |

OTHER PUBLICATIONS

Ir Gvon Khan et al.; 46.4: Ultra-Thin O-Polarizers' Superiority over E-Polarizers for LCDs; SID 04 Digest; May 2004, pp. 1316-1319, vol. 35, Issue 1.

\* cited by examiner

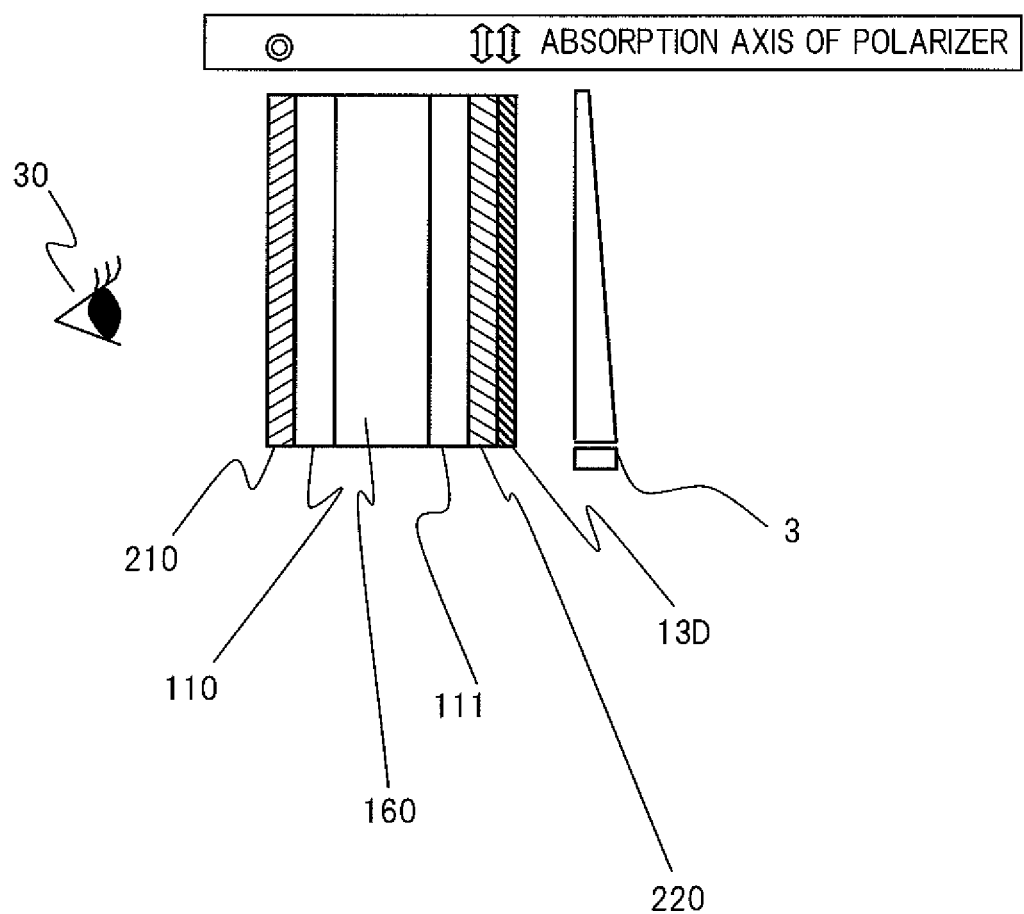

POLARIZATION ELEMENT, METHOD FOR MANUFACTURING THE SAME, AND LIQUID CRYSTAL DISPLAY DEVICE

CROSS-REFERENCE TO RELATED APPLICATION

The present application claims priority from Japanese application JP 2009-098495 filed on Apr. 14, 2009, the content of which is hereby incorporated by reference into this application.

BACKGROUND OF THE INVENTION

1. Field of the Invention

The present invention relates to a liquid crystal display device, a polarization element used therefor, and a method for manufacturing the polarization element.

2. Description of the Related Art

Display devices are a medium for transmitting information visually to people and play an important role for people and groups in the sophisticated modern information society. The performance of liquid crystal display devices has significantly increased in recent years, and liquid crystal display devices have been adopted as display devices for cellular phones, personal computers, large screen televisions, and the like. Liquid crystal display devices are generally formed of a liquid crystal display panel and a backlight (illumination device) that is placed on the rear side of the liquid crystal display panel and illuminates the liquid crystal display panel with light. In the case where a color image is displayed, each pixel is formed of three sub pixels that correspond to the three primary colors of red, blue, and green, for example, and the sub pixels that correspond to the respective colors are controlled independently so that various colors are reproduced.

At present, the range of application of the liquid crystal display device to mobile devices such as cellular phones and digital cameras is expanding, and there is an increasing demand for the liquid crystal display device that is further reduced in thickness while achieving a higher contrast. Currently, small and medium-sized mass-produced liquid crystal display panels have been reduced in thickness to around 1 mm, and the smallest thickness of such a liquid crystal display panel officially recognized is 0.56 mm. In order to reduce the thickness of a liquid crystal display panel, it is necessary to reduce the thickness of members, such as a polarizer, forming the liquid crystal display panel. In a case where the thickness of a liquid crystal display panel is 0.56 mm, the polarizer has a thickness of 0.1 to 0.2 mm.

Polarizers which are currently available include a film-type polarizer and a thin film polarizer. The thin film polarizer may be reduced in thickness to 1/1000th of the film-type polarizer. A conventional film-type polarizer is formed of, for example, a poly-vinyl alcohol (PVA) resin, iodine, and a protection layer, in which the PVA resin mixed with iodine is drawn so that the dye molecules are unidirectionally aligned. In contrast, the thin film polarizer is formed of a dye (and a protection layer as necessary), and hence the thin film polarizer may be made smaller in thickness than the film-type polarizer. The dye in the thin film polarizer is aligned by a shear stress applied when the dye molecules are coated or by an alignment force of a base material. Technologies used for the above-mentioned thin film polarizer have been reported in Y. Ukai et al., "Current Status and Future Prospect of In-Cell Polarizer Technology", SID 04 DIGEST, pp. 1170-1173, 2004, Ir Gvon Khan et al., "Ultra-Thin O-Polarizers' Superiority over E-Polarizers for LCDs", SID 04 DIGEST, pp. 1316-1319, 2004, JP 2006-146116 A, JP 2006-91393 A, and JP 2008-89966 A.

SUMMARY OF THE INVENTION

In Y. Ukai et al., "Current Status and Future Prospect of In-Cell Polarizer Technology", SID 04 DIGEST, pp. 1170-1173, 2004, it is described that the contrast of a single polarizer, which is represented by a ratio between the parallel transmittance and the orthogonal transmittance in the thin film polarizer, becomes high when the film thickness is increased, while becomes low when the film thickness is reduced. It is further described that the parallel transmittance becomes low when the film thickness is increased while becomes high when the film thickness is reduced. Here, the parallel transmittance refers to a transmittance obtained when substantially linearly polarized light is made incident in an orthogonal direction with respect to the absorption axis of the thin film polarizer, and the orthogonal transmittance refers to a transmittance obtained when substantially linearly polarized light is made incident in parallel to the absorption axis of the thin film polarizer. Further, the contrast of two polarizers each including a thin film polarizer tends to become saturated as the film thickness increases, the contrast being represented by the ratio of transmittance obtained in each of the cases where the polarizers are arranged in parallel to each other and where the polarizers are arranged in orthogonal to each other.

JP 2006-146116 A discloses a film structure obtained by laminating a thin film polarizer having a film thickness of 300 to 800 nm on a substrate. And JP 2006-146116 A discloses configurations for attaining a high degree of polarization, high transmittance, and a high contrast. However, in the thin film polarizer, the film thickness and the formation condition thereof cause dye molecules to be out of alignment. Specifically, in a case where the dye molecules are aligned by a shear stress, out of alignment of the dye molecules become uniformly and irrespective of the distance from the substrate in the film thickness direction. In a case where the dye molecules are aligned by an alignment force of the substrate, the dye molecules are likely to become out of alignment to a larger degree as the distance from the substrate increases. The out of alignment of dye molecules causes deterioration in the contrast of a polarization member which includes the thin film polarizer, which even leads to deterioration in the transmittance and the contrast of a liquid crystal display device which includes the thin film polarizer.

The thin film polarizer may be used as a supplementary polarizer of the liquid crystal display device. However, for example, when the thin film polarizer is employed as the supplementary polarizer to be disposed between a pair of polarizers, light entering the thin film polarizer is scattered due to the out of alignment of dye molecules in the thin film polarizer. Due to the scattering of light, the front luminance of the liquid crystal display device increases in a black mode, which results in deterioration in the front contrast.

The present invention has been made to solve the above-mentioned problems, and therefore, it is an object of the present invention to provide a polarization element including a thin film polarizer which has a high contrast, and a method for manufacturing the polarization element, by taking advantage of the dependence of an optical characteristic on film thickness in the thin film polarizer. It is another object of the present invention to attain a high contrast in a liquid crystal display device which employs the thin film polarizer as a polarizer or a supplementary polarizer. Other objects including the above-mentioned objects and novel features of the present invention become apparent from the following description in this specification with reference to the accompanying drawings.

In order to solve the above-mentioned problems, a liquid crystal display device according to the present invention includes: a liquid crystal cell including a first substrate disposed on an observer side, a second substrate disposed on a backlight side, and a liquid crystal layer sealed between the first substrate and the second substrate; a first polarization member for transmitting light in a predetermined polarization direction, the first polarization member being disposed on the observer side relative to the liquid crystal layer; and a second polarization member for transmitting light in another polarization direction which is orthogonal to the predetermined polarization direction, the second polarization member being disposed on the backlight side relative to the liquid crystal layer, in which: at least one of the first polarization member and the second polarization member includes a multilayer thin film polarizer including a plurality of thin film polarizers which are stacked so that transmission axes of the plurality of thin film polarizers are aligned; and at least one of the plurality of thin film polarizers in the multilayer thin film polarizer includes a thin film polarizer formed in a film thickness equal to or smaller than 300 nm by coating with dye molecules which are aligned by a shear stress.

Further, according to one aspect of the present invention, in the liquid crystal display device: the first polarization member may include a first polarizer provided on the observer side of the first substrate; the second polarization member may include a second polarizer provided on the backlight side of the second substrate; and one of the first polarizer and the second polarizer may be formed by including the multilayer thin film polarizer.

Further, according to another aspect of the present invention, in the liquid crystal display device: the first polarization member may include a first polarizer provided on the observer side of the first substrate, and a first supplementary polarizer provided so that an absorption axis of the first supplementary polarizer is in parallel to an absorption axis of the first polarizer; and the first supplementary polarizer may be formed by including the multilayer thin film polarizer.

Further, according to another aspect of the present invention, in the liquid crystal display device: the second polarization member may include a second polarizer provided on the backlight side of the second substrate, and a second supplementary polarizer provided so that an absorption axis of the second supplementary polarizer is in parallel to an absorption axis of the second polarizer; and the second supplementary polarizer may be formed by including the multilayer thin film polarizer.

Further, according to another aspect of the present invention, in the liquid crystal display device: the first substrate may include a color filter layer; and the first polarization member may be formed by including the multilayer thin film polarizer, and disposed between the color filter layer and the liquid crystal layer.

Further, according to another aspect of the present invention, in the liquid crystal display device: the first supplementary polarizer may be disposed between the first polarizer and the first substrate; and the first supplementary polarizer and the first substrate may sandwich an alignment layer disposed therebetween.

Further, according to another aspect of the present invention, in the liquid crystal display device: the second supplementary polarizer may be disposed between the second polarizer and the second substrate; and the second supplementary polarizer and the second substrate may sandwich an alignment layer disposed therebetween.

Further, according to another aspect of the present invention, in the liquid crystal display device, the first supplementary polarizer may be disposed on the observer side of the first polarizer as being in contact with the first polarizer.

Further, according to another aspect of the present invention, in the liquid crystal display device, the second supplementary polarizer may be disposed on the backlight side of the second polarizer as being in contact with the second polarizer.

In order to solve the above-mentioned problems, a polarization element according to the present invention includes: a substrate; and a multilayer thin film polarizer including a plurality of thin film polarizers stacked an upper side of the substrate so that transmission axes of the plurality of thin film polarizers are aligned, in which: at least one of the plurality of thin film polarizers includes a first thin film polarizer formed by coating with dye molecules which are aligned in a predetermined direction by a shear stress; and the first thin film polarizer is formed in a predetermined thickness.

Further, according to one aspect of the present invention, in the polarization element: the substrate may have an alignment force; the multilayer thin film polarizer may include a second thin film polarizer formed on the substrate by coating with dye molecules which are aligned in the predetermined direction by the alignment force; the second thin film polarizer may be stacked with so that the dye molecules are made out of alignment as being away in an upward direction from the substrate; and the first thin film polarizer may be stacked an upper side of the second thin film polarizer, the first thin film polarizer and the second thin film polarizer being different from each other in out of alignment of dye molecules.

Further, according to another aspect of the present invention, in the polarization element, the first thin film polarizer stacked in the multilayer thin film polarizer may have a thickness equal to or smaller than 300 nm.

Further, according to another aspect of the present invention, in the polarization element, the first thin film polarizer stacked in the multilayer thin film polarizer may have a thickness which is 100 nm or more and 270 nm or less.

Further, according to another aspect of the present invention, in the polarization element: the dye molecules in the first thin film polarizer may be lyotropic liquid crystal; and the first thin film polarizer may be formed in a film thickness falling within a range of 270 nm ±20 nm.

In order to solve the above-mentioned problems, a method of manufacturing a polarization element according to the present invention includes: a thin film polarizer stacking step of stacking a thin film polarizer by coating with dye molecules; and an insolubilization step of subjecting the thin film polarizer stacked in the thin film polarizer stacking step to insolubilization processing, the thin film polarizer stacking step and the insolubilization step being alternately repeated a plurality of times, to thereby manufacture a polarization element which includes a multilayer thin film polarizer in which a plurality of the thin film polarizers are stacked.

According to the present invention, a high contrast can be achieved in the polarization element. And according to the present invention, a high contrast can be achieved in the liquid crystal device with the polarization element. And according to the present invention, the polarization element can be manufactured.

BRIEF DESCRIPTION OF THE DRAWINGS

In the accompanying drawings;

FIG. 23 is an explanatory diagram illustrating a first polarizer and a second polarizer of the liquid crystal display device according to the third embodiment, and further illustrating an absorption axis of the second supplementary polarizer.

DETAILED DESCRIPTION OF THE INVENTION

In the following, embodiments of the present invention are described in reference to the drawings. Various modifications may be made to the present invention. Further, combinations of the following embodiments are included in the present invention. It should be noted that, though each embodiment employs an in-plane switching (IPS) system liquid crystal display panel, the present invention is not limited thereto. For example, a twisted nematic (TN) system liquid crystal display panel or a vertical alignment (VA) system liquid crystal display panel may also be employed. In the IPS system liquid crystal display panel, liquid crystal molecules are rotated in a plane by a so-called in-plane electric field. The IPS system liquid crystal display panel also includes a liquid crystal display panel in which a pixel electrode and a common electrode are formed in different layers on the same substrate, with at least an electrode that is closer to a liquid crystal layer being formed in a comb shape so as to generate a fringe electric field, to thereby drive the liquid crystal.

First Embodiment

Figure 1:
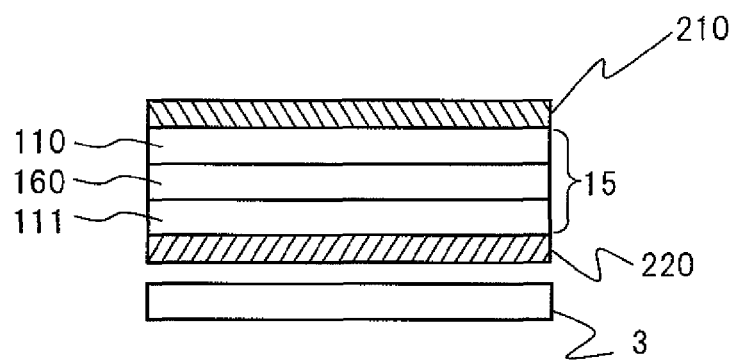
FIG. 1 is a schematic cross sectional diagram schematically illustrating a configuration of a liquid crystal display panel according to a first embodiment of the present invention.

FIG. 1 is a schematic cross sectional diagram schematically illustrating a configuration of a liquid crystal display panel in a liquid crystal display device according to a first embodiment of the present invention. A liquid crystal cell 15 includes a color filter substrate in which a color filter is formed (hereinafter, referred to as first substrate 110), an active matrix substrate in which thin film transistors are arranged in a matrix (hereinafter, referred to as second substrate 111), and a liquid crystal layer 160 sealed therebetween. Further, a first polarizer 210 is formed on a surface on an observer side of the liquid crystal cell 15, and a second polarizer 220 is formed on another surface on a backlight 3 side of the liquid crystal cell 15. The first polarizer 210 and the second polarizer 220 each include a multilayer-type thin film polarizer (multilayer thin film polarizer) to be described later, and the multilayer thin film polarizer includes a plurality of thin film polarizers which are stacked so that absorption axes thereof are in parallel to one another. Further, the first polarizer 210 and the second polarizer 220 are formed so that the first polarizer 210 and the second polarizer 220 have absorption axes orthogonal to each other.

The first polarizer 210 and the second polarizer 220 in the first embodiment are each formed of a multilayer thin film polarizer which includes a plurality of thin film polarizers stacked on a substrate. The thin film polarizer in the first embodiment is formed of lyotropic liquid crystal disclosed in Y. Ukai et al., "Current Status and Future Prospect of In-Cell Polarizer Technology", SID 04 DIGEST, pp. 1170-1173, 2004, and may be formed of a material disclosed in Ir Gvon Khan et al., "Ultra-Thin O-Polarizers' Superiority over E-Polarizers for LCDs", SID 04 DIGEST, pp. 1316-1319, 2004. The thin film polarizer may be formed by coating with those materials. In a case of coating with lyotropic liquid crystal, the dye molecules may be aligned by using a slit dye coater or the like. The slit dye coater supplies a material for forming the thin film polarizer in a solution state onto an area to be coated while applying a pressure to the material, to thereby streach the material in a coating direction. The dye molecules are aligned in this process, to thereby form the thin film polarizer which is to serve as one of the layers in the multilayer thin film polarizer. Further, the thin film polarizer is subjected to insolubilization processing before another thin film polarizer to serve as an upper layer is further stacked the thin film polarizer serving as a lower layer. The thin film polarizer is formed as a lyotropic liquid crystal phase which develops a chromonic phase through sulfonation of indanthrone derivative, dibenzimidazole derivative of perylenetetracarboxylic acid, or naphthalenetetracarboxylic acid derivative. Then, the thin film polarizer is desulfonated by barium chloride, to thereby make the thin film polarizer serving as a lower layer insoluble. In this manner, dye molecules in the thin film polarizer serving as a lower layer are prevented from becoming newly out of alignment when another thin film polarizer to serve as an upper layer is laminated on the thin film polarizer. The multilayer thin film polarizer in the first embodiment is formed by alternately repeating a thin film polarizer stacking step of stacking a thin film polarizer by using a slit dye coater or the like which applies a shear stress on the thin film polarizer to be coated so as to align the dye molecules and an insolubilization processing step of insolubilizing the thin film polarizer thus laminated.

It should be noted that a transparent interlayer film formed of an inorganic material or an organic material may be formed between the two thin film polarizers serving as a lower layer and an upper layer. The transparent interlayer film is preferable to a non-transparent interlayer film in view of preventing transmittance from being reduced on the transmission axis side in the thin film polarizer.

Further, the interlayer film may desirably have a refractive index falling within the range of ±0.2 with reference to the refractive index (1.5 to 1.6) on the transmission axis side of the thin film polarizer. With this configuration, a reduction in transmittance and color effect due to optical interference may be suppressed, which is otherwise caused by the difference in refractive index between the interlayer film and the thin film polarizer. In this case, the interlayer film may preferably be formed of a polyimide (with a refractive index of 1.4 to 1.7) resin, a polycarbonate (with refractive index of 1.4 to 1.7) resin, or the like.

Further, the interlayer film may desirably be formed by, for example, vapor phase deposition, specifically by silane coupling treatment. In this case, the interlayer film formed by vapor phase deposition may be formed as a monomolecular film on the surface of the thin film polarizer serving as a lower layer, and hence the thickness of the interlayer film is significantly reduced. With this configuration, the reduction in the transmittance and influence of the optical interference may further be suppressed. Further, due to the silane coupling treatment, the surface of the thin film polarizer serving as a lower layer has a siloxane structure or a silazane structure, and the siloxane structure or the silazane structure develops an interaction with the functional group of dye molecules of the thin film polarizer serving as an upper layer, which improves the orientation of dye molecules in the thin film polarizer serving as an upper layer. It should be noted that the surface of the thin film polarizer serving as a lower layer may be first subjected to the silane coupling treatment before being subjected to the oxidation treatment. In this manner, the surface of the film formed by the silane coupling treatment becomes hydrophilic and is improved in wetting characteristics, to thereby allow the thin film polarizer serving as an upper layer to be formed uniform, with the result that the dichronic ratio may be improved. Still further, as compared to a case where a resin material dissolved in a solvent is applied on the thin film polarizer serving as a lower layer, the degradation in the orientation of dye molecules in the thin film polarizer serving as a lower layer, which is otherwise caused by the solvent, may be suppressed.

As described above, the interlayer film is formed between the thin film polarizers each serving as a lower layer and an upper layer, to thereby improve the optical characteristic as compared to a thin film polarizer of a single layer.

Figure 2:
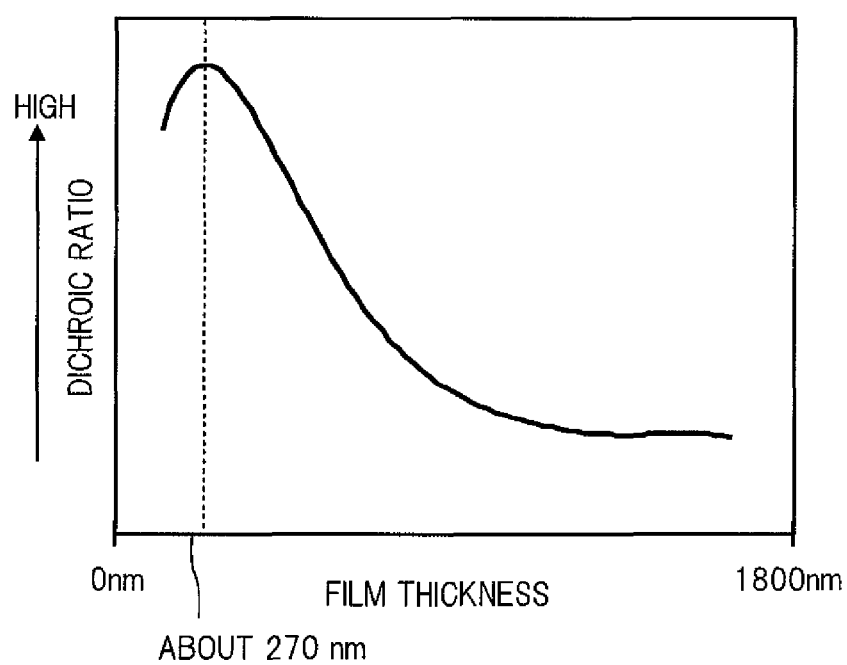
FIG. 2 is a graph illustrating the dependency of an optical characteristic on the film thickness of a thin film polarizer formed by a shear stress.

In the first embodiment, the thin film polarizers in the multilayer thin film polarizer are each self-aligned by a shear stress. The orientation formed by the shear stress in the thin film polarizer (first thin film polarizer) has a dependency on a film thickness as illustrated in FIG. 2. Here, FIG. 2 is a graph illustrating the dependency of an optical characteristic on the film thickness of a thin film polarizer formed by a shear stress, and the optical characteristic of FIG. 2 is represented by the dichronic ratio which serves as a parameter indicating the orientation of dye molecules. As illustrated in FIG. 2, in the case of the material of the thin film polarizer studied in the first embodiment, a maximum dichronic ratio is obtained at a film thickness of about 270 nm, and the dichronic ratio reduces from the peak value reached at the film thickness of about 270 nm. In other words, when the lyotropic liquid crystal is used as in the first embodiment, an excellent dichronic ratio (excellent orientation) may be attained at a film thickness equal to or less than 300 nm, which is smaller than a conventional film thickness of 300 to 800 nm. Accordingly, in the case of forming the multilayer thin film polarizer by stacking a plurality of thin film polarizers, the plurality of thin film polarizers which are formed by a shear stress may preferably be stacked as each having a film thickness equal to or smaller than 300 nm, in particular, each thin film polarizer of the multilayer thin film polarizer may be formed to have a film thickness in the proximity of 270 nm where the dichronic ratio reaches its peak. Specifically, the first polarizer 210 and the second polarizer 220 in the first embodiment each include a multilayer thin film polarizer which includes two thin film polarizers stacked, each being formed to have a film thickness of 270 nm±20 nm with the production tolerance. It should be noted that the dichronic ratio is obtained as a ratio between the absorbance in a direction parallel to the absorption axis and the absorbance in a direction orthogonal to the absorption axis.

Figure 3:
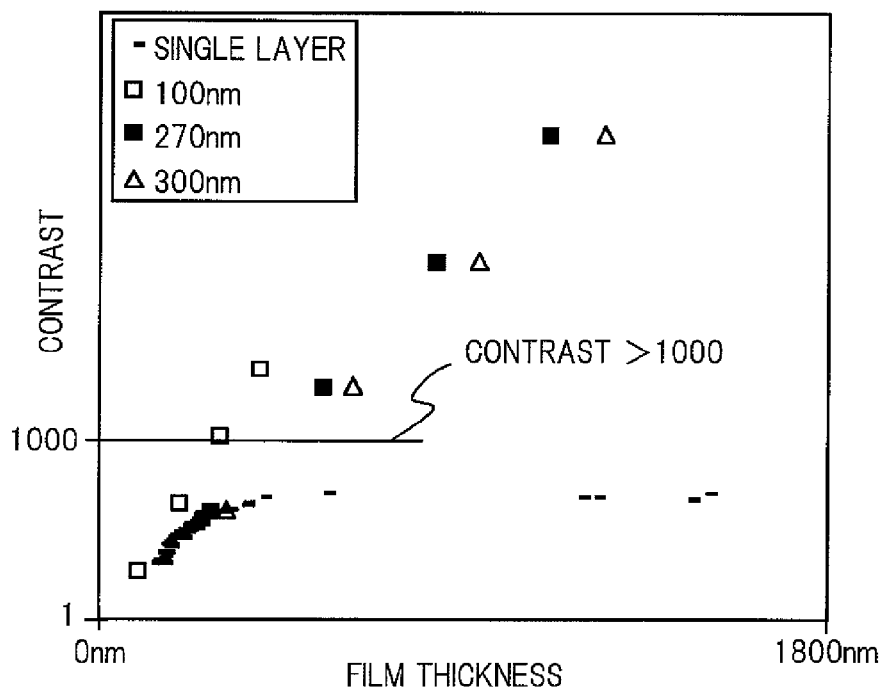
FIG. 3 is a graph illustrating a relation between the film thickness and the contrast of a multilayer-type thin film polarizer.

FIG. 3 is a graph illustrating a relation between the film thickness and the contrast of the multilayer-type thin film polarizer. Reference symbols plotted in FIG. 3 indicate results obtained in cases of multilayer thin film polarizers which are each formed by stacking a plurality of thin film polarizers each having a thickness of 100 nm, 270 nm, or 300 nm while being self-aligned by a shear stress, and in a case of a conventional thin film polarizer which is formed of a single layer. FIG. 3 illustrates cases where one to four of the thin film polarizers of 100 nm, 270 nm, and 300 nm are stacked, and each case is plotted in FIG. 3. Here, the number of the thin film polarizers to be stacked is limited to 4 merely by giving consideration to practicality in terms of process cost, and five or more of the thin film polarizers may also be stacked. The contrast (ordinate) of FIG. 3 is obtained based on parallel transmittance and orthogonal transmittance which are measured by using a substantially same of the multilayer thin film polarizers or a thin film polarizer. As illustrated in FIG. 3, when the film thickness of a thin film polarizer is equal to or larger than 500 nm, the contrast saturates in the case of the conventional thin film polarizer including a single layer, whereas in the case of the polarization element formed of the multilayer thin film polarizer including two to four thin film polarizers stacked, the contrast increases even if the film thickness further increases. It should be noted that the graphs of FIGS. 3 to 6 illustrating the dependency of the optical characteristic on the film thickness (relation between contrast or the parallel transmittance and the film thickness) each illustrate an optical characteristic obtained in a case where the thin film polarizers are stacked on a substrate which does not have an alignment force, which is an optical characteristic obtained for a thin film polarizer stacked while having dye molecules uniformly aligned for each layer.

According to FIG. 3, in the conventional thin film polarizer of a single layer, the contrast is likely to saturate as the film thickness increases, whereas the contrast is likely to increase in a case where a plurality of thin film polarizers are stacked. The reason is as follows. In the conventional thin film polarizer of a single layer, the orientation of the dye molecules is degraded when the film thickness exceeds about 270 nm. On the other hand, in the multilayer thin film polarizer in which thin film polarizers are stacked with, the orientation of dye molecules is uniformly maintained in each of the thin film polarizers thus laminated even when the entire film thickness increases as the number of thin film polarizers thus stacked increases.

In order to obtain a high contrast in a case where the thin film polarizers to be stacked are each small in thickness, the number of thin film polarizers to be stacked needs to be increased. There is a fear of cost increase when the number of the thin film polarizers to be stacked is increased. Accordingly, when manufacturing the multilayer thin film polarizer, the number of the thin film polarizers to be stacked may desirably be three at a maximum. Meanwhile, the current small and medium-sized liquid crystal display panels have a contrast of 200 to 1,000. A contrast of equal to or larger than 1,000 for a multilayer thin film polarizer may be obtained, the contrast being represented by the ratio of transmittance obtained in each of the cases where two multilayer thin film polarizers arranged in parallel to each other and where the two multilayer thin film polarizers are arranged in orthogonal to each other, by stacking at least two or three or more thin film polarizers each having a film thickness equal to or larger than 100 nm as illustrated in FIG. 3.

Figure 4:
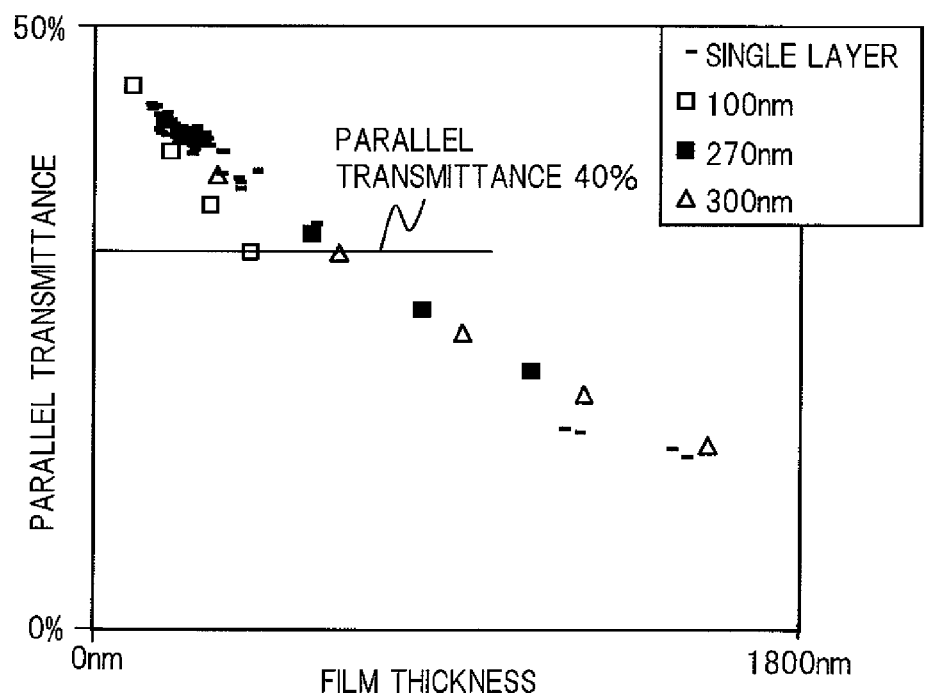
FIG. 4 is a graph illustrating a relation between the film thickness and the parallel transmittance of a multilayer-type thin film polarizer.

As illustrated in FIG. 3, the case where the thin film polarizers stacked each have a smaller film thickness produces a larger effect of improving the contrast with respect to the film thickness, as compared to the case where the thin film polarizers stacked each have a larger film thickness. FIG. 4 is a graph illustrating a relation between the film thickness and the parallel transmittance of the multilayer thin film polarizer. As illustrated in FIG. 4, the parallel transmittance with respect to the film thickness reduces at a larger degree in a case where the thin film polarizers stacked each have a smaller film thickness as compared to a case where the thin film polarizers stacked each have a larger film thickness. The reason is that the parallel transmittance and the orthogonal transmittance of the multilayer-type thin film polarizers reduce as the number of stacking the thin film polarizers increases. Accordingly, there may be produced a larger effect of improving the contrast when the number of stacking the thin film polarizers is large, whereas the parallel transmittance is significantly reduced. On the contrary, there may be produced a smaller effect of improving the contrast when the number of stacking the thin film polarizers is small, while a reduction in the parallel transmittance may also be small.

Figure 5:
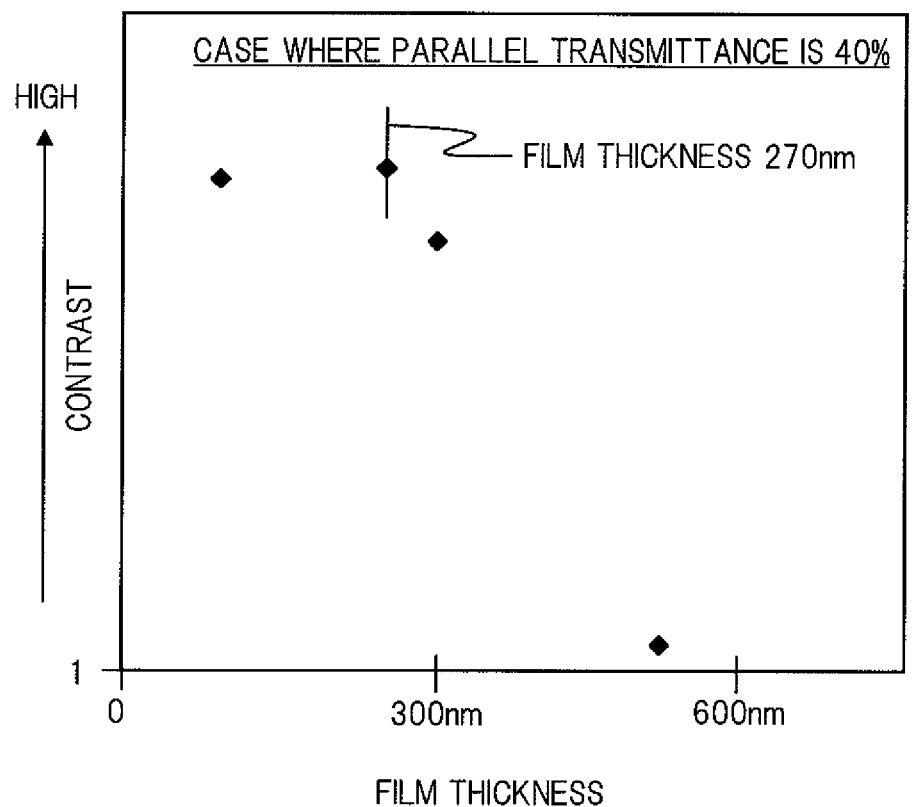
FIG. 5 is a graph illustrating a relation between the film thickness and the contrast of each of thin film polarizers stacked in a multilayer thin film polarizer, when a parallel transmittance of 40% is maintained.

The first polarizer 210 and the second polarizer 220 need to be increased in parallel transmittance in order to attain high luminance in the liquid crystal display device. At present, the polarizer is required to have a parallel transmittance of 40% or more. Accordingly, in the first polarizer 210 and the second polarizer 220 each including a multilayer thin film polarizer, conditions, such as film thickness, need to be selected in each thin film polarizer forming the multilayer thin film polarizer so that the multilayer thin film has a parallel transmittance of 40%. FIG. 5 is a graph illustrating relations between the film thickness and the contrast of each of thin film polarizers stacked in a multilayer thin film polarizer when a parallel transmittance of 40% is maintained. FIG. 5 illustrates contrasts in the film thickness of 100 nm, 270 nm, 300 nm, and 500 nm. The parallel transmittance of substantially 40% is attained in each of the cases where four layers each having a film thickness of 100 nm are stacked, two layers each having a film thickness of 270 nm are stacked, two layers each having a film thickness of 300 nm are stacked, and one layer having a film thickness of 500 nm is stacked, and FIG. 5 illustrates a contrast of each of the cases. As illustrated in FIG. 5, the contrast of the multilayer-type thin film polarizer, with the parallel transmittance of 40%, reaches a maximum when the thin film polarizers each having a film thickness of about 270 nm are stacked. This is because the orientation of dye molecules is most excellent when the film thickness is 270 nm. Meanwhile, the contrast of the multilayer-type thin film polarizer, with the parallel transmittance of 40%, significantly reduces when the thin film polarizers to be stacked each have a film thickness falling within a range from 270 to 300 nm. The reason is as follows. When the thin film polarizers to be stacked d each have a film thickness smaller than 270 nm, there is produced a larger effect of improving the contrast, whereas when the film thickness is larger than 270 nm, there is produced a smaller effect of improving the contrast. Accordingly, in order to manufacture the multilayer-type thin film polarizer which is increased in contrast while ensuring the parallel transmittance to 40%, it is further preferable that the thin film polarizers to be stacked each have a film thickness equal to or smaller than 270 nm.

Figure 6:
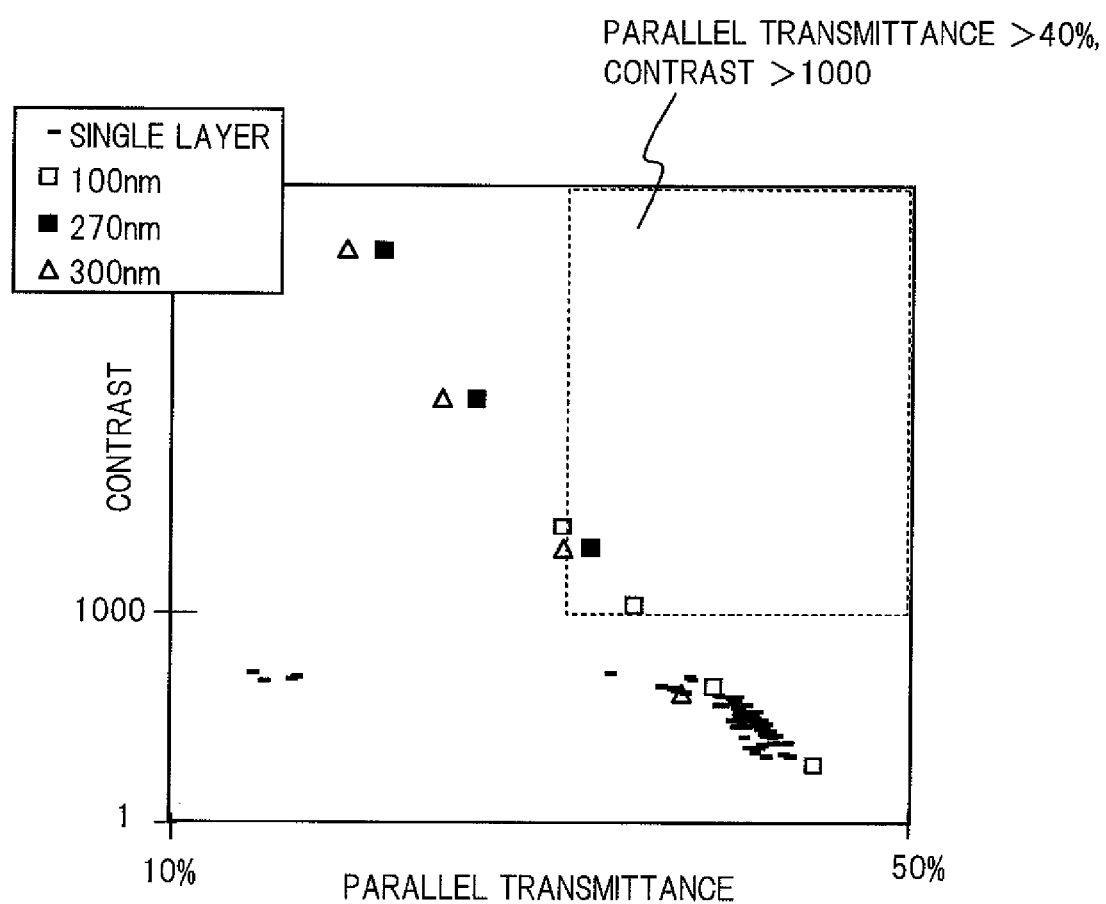
FIG. 6 is a graph illustrating a relation between the parallel transmittance and the contrast in the multilayer-type thin film polarizer.

FIG. 6 is a graph illustrating a relation between the parallel transmittance and the contrast in the multilayer thin film polarizer. FIG. 6 illustrates an optical characteristic in each of the cases where the thin film polarizer is a single layer, where the multilayer thin film polarizer includes a plurality of thin film polarizers each having a thickness of 100 nm, 270 nm, and 300 nm, respectively, and also illustrates that the parallel transmittance decreases while the contrast improves as the number of stacked layers increases. Further, the dot-dash-line of FIG. 6 indicates a region where the parallel transmittance is equal to or larger than 40% and the contrast is equal to or larger than 1,000. The multilayer thin film polarizer in which three thin film polarizers each having a film thickness of 100 nm are stacked and the multilayer thin film polarizer in which two thin film polarizers each having a film thickness of 270 nm are stacked have optical characteristics falling within the range as indicated by the dot-dash-line. Accordingly, the thin film polarizers each having a thickness of 100 nm to 270 nm may be employed, to thereby attain high contrast in a polarization member while suppressing a reduction in parallel transmittance, at a low cost of stacking three or less number of layers.

It should be noted that, according to the first embodiment, a plurality of thin film polarizers each having a film thickness of, 270 nm±20 nm are stacked a substrate which does not have an alignment force, and the dye molecules are self-aligned in the plurality of thin film polarizers by a shear stress, to thereby form the multilayer thin film polarizer. Accordingly, the dye molecules are uniformly aligned in each of the plurality of thin film polarizers in the multilayer thin film polarizer. Alternatively, the multilayer thin film polarizer may be formed on a substrate which has an alignment force.

The alignment force may be imparted by providing an alignment layer on the substrate. The alignment layer may be formed of a polyimide polymer or diamond like carbon, similarly to the alignment layer for rubbing a liquid crystal layer, which is formed on the first substrate 110 or on the second substrate 111. When using a member having an alignment force, a thin film polarizer stacked on an upper side of the substrate while being in contact therewith corresponds to the thin film polarizer (second thin film polarizer) in which dye molecules are aligned by the alignment force. In this case, as described above, the alignment force reduces as the distance from the substrate in an upward direction increases, which causes the dye molecules to be out of alignment. On the other hand, in thin film polarizers (first thin film polarizers) stacked as a second layer and as layers thereabove in the multilayer thin film polarizer, dye molecules are uniformly aligned by a shear stress because the thin film polarizer is not in contact with the substrate having an alignment force. The dependence of an optical characteristic on film thickness in the first thin film polarizer is illustrated in FIG. 2. However, as regards the dependence of an optical characteristic on film thickness in the second thin film polarizer, the orientation of dye molecules is likely to improve when the film thickness is smaller. Accordingly, for example, when a thin film polarizer with a film thickness of equal to or smaller than 300 nm is formed on a substrate imparted with an alignment force, the thin film polarizer being in contact with the substrate, and thin film polarizers from the second layer which are self-aligned by a shear stress may be formed in a film thickness of 270 nm±20 nm, to thereby improve contrast and transmittance as compared to a case where all the thin film polarizers are self-aligned by the shear stress. The thin film polarizer which comes in contact with the substrate imparted with the alignment force may be stacked in a film thickness similar to those of other thin film polarizers stacked as a second layer and thereabove.

It should be noted that in order to obtain a high contrast in a case where the thin film polarizers to be stacked are each small in thickness, the number of thin film polarizers to be laminated needs to be increased. There is a fear of cost increase when the number of the thin film polarizers to be stacked is increased. Accordingly, the number of the thin film polarizers to be stacked may desirably be three at a maximum even in a case of forming one of the thin film polarizers as being in contact with the alignment layer. For this reason, even in a case of forming a thin film polarizer on an alignment layer, the thin film polarizers each having a thickness of 100 to 270 nm may be stacked, to thereby achieve high contrast, high transmittance, and low cost, as compared to a case of forming a thin film polarizer by a shear stress on a substrate not having an augment layer.

In the first embodiment, the thin film polarizers in the multilayer thin film polarizer are formed to be substantially the same in film thickness. However, the film thickness may be varied among the thin film polarizers. Further, the thin film polarizers according to the first embodiment are each formed of lyotropic liquid crystal, however, different materials may be used for each of the thin film polarizers. In the first embodiment, the first polarizer 210 and the second polarizer 220 are both formed of the polarization element including the multilayer thin film polarizer. However, one of the first polarizer 210 and the second polarizer 220 may be formed of the polarization element including the multilayer thin film polarizer, while the other one of the polarizer may be formed of an extended form of a PVA resin mixed with iodine.

Figure 7:
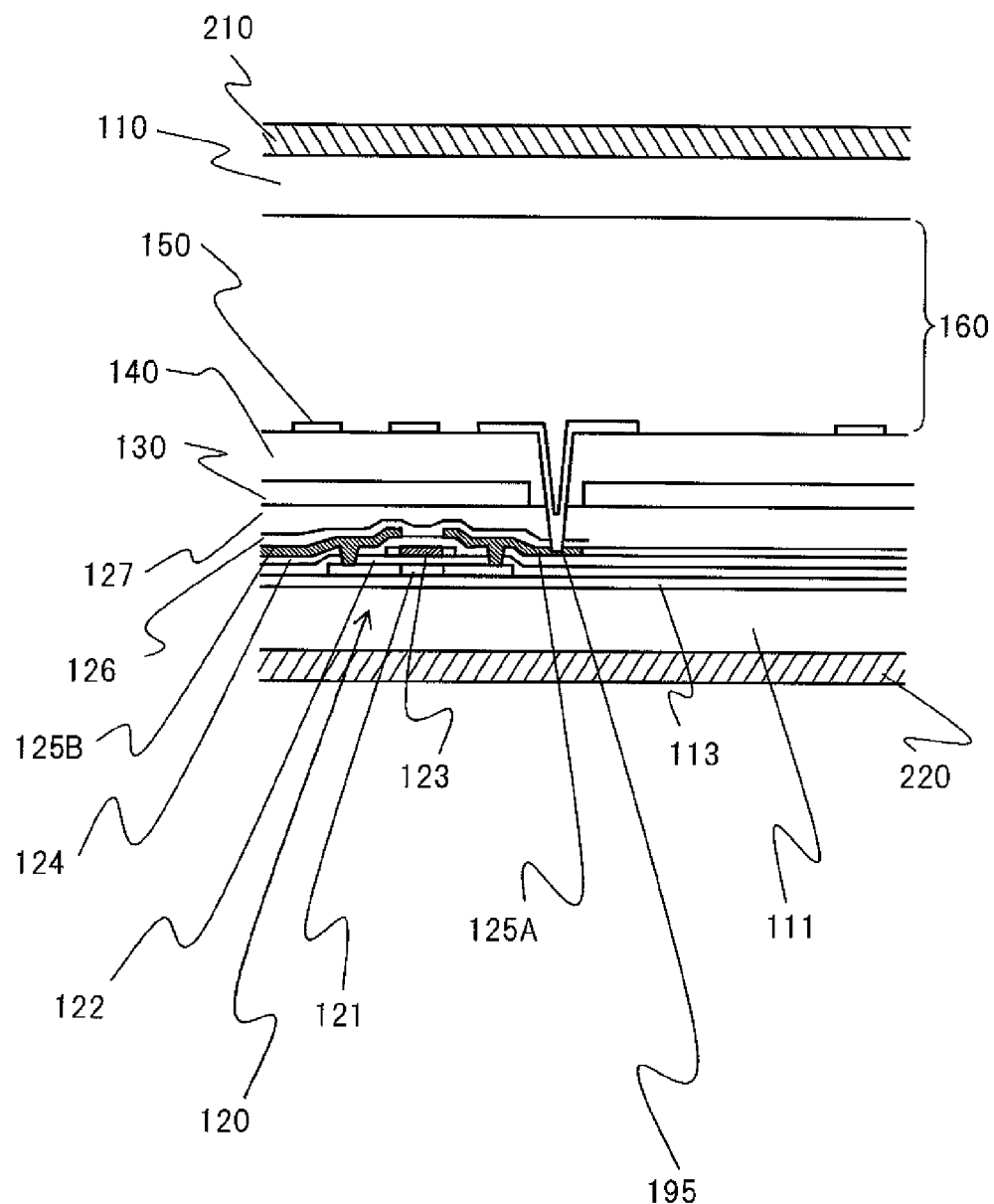
FIG. 7 is a schematic diagram illustrating a cross section taken along the line A-A' of FIG. 8 which is a plan view schematically illustrating a configuration of a main part of a sub pixel of the liquid crystal display panel according to the first embodiment.

FIG. 7 is a cross sectional view schematically illustrating a configuration of a main part of a sub pixel 100 of the liquid crystal display panel 1 (which mainly includes the first substrate 110, the liquid crystal layer 160, the second substrate 111, the first polarizer 210, and the second polarizer 220) according to the first embodiment. It should be noted that FIG. 7 schematically illustrates a cross section taken along the line A-A' of FIG. 8. Further, FIG. 9 is a block diagram schematically illustrating an overall layout in the liquid crystal display panel 1 according to the first embodiment. As illustrated in FIG. 9, the liquid crystal display panel 1 includes a display area 5 in a region including a central part of the second substrate 111. On an upper side of the display area 5, a data drive circuit 2 for outputting an image signal to a data line (signal line) 7 is provided. On the left side of the display area 5, a scanning drive circuit 4 for outputting a scanning signal to a gate line (scanning line) 8 is provided. The data drive circuit 2 and the scanning drive circuit 4 are formed of a shift register circuit, a level-shift circuit, an analog switch circuit, and the like, which are formed of complementary type circuits using N-channel type thin film transistors (TFTs) and P-channel type thin film transistors (TFTs). The liquid crystal display panel 1 is provided with, similarly to a conventional active-matrix type liquid crystal display panel, a plurality of gate lines 8 and a plurality of data lines 7 which extend in a direction intersecting with a direction in which the gate lines 8 extend, and sub pixels are placed in a matrix at intersections between the gate lines 8 and the data lines 7.

As illustrated in FIG. 7, the liquid crystal display panel 1 according to the first embodiment includes the first substrate 110 and the second substrate 111, which have insulation properties and are made of flat, transparent, and optically isotropic bodies. Glass is generally used for the first substrate 110 and the second substrate 111, or a polymer film which satisfies the above-mentioned requirements and is improved in heat resistance and durability may also be used.

The first substrate 110 is provided with a color filter layer and a rubbing alignment layer (both not shown in FIG. 7) stacked thereon. The first substrate 110 has a color filter layer formed thereon, and the first substrate is referred to as color filter substrate. The color filter layer is used to transmit colors carried by the individual sub pixels, for example, the three primary colors of additive color mixing, namely, red, green, and blue, the three primary colors of subtractive color mixing, namely, yellow, magenta, and cyan, or other desired colors for sub pixels such as bluish-green or yellowish-green. The rubbing alignment layer may be formed of a polyimide polymer or diamond like carbon.

The second substrate 111 includes a switching device 120. On the second substrate 111, TFTs are arranged in a matrix, and the second substrate 111 is referred to as active matrix substrate. The switching device 120 is formed of a thin film transistor which includes a semiconductor layer including poly-silicon, amorphous silicon, or an organic matter. Here, though a case of a thin film transistor made of poly-silicon is described by way of example, the present invention is not limited thereto. The switching device 120 formed of a poly-silicon thin film transistor includes a gate insulating layer 122, a gate electrode 123, a first insulation layer 124, an electrode layer 125A, an electrode layer 125B, and a second insulation layer 126, which are formed above a poly-silicon layer that includes a semiconductor layer 121 which is to serve as a source/drain areas and a channel area.

The gate insulating layer 122 and the first insulation layer 124 are made of SiOx (silicon oxide), for example, and the second insulation layer 126 is made of SiNx (silicon nitride), for example. A metal electrode material may be used for the electrode layer 125A and the electrode layer 125B. A film having a three layer structure where an aluminum layer is sandwiched between titanium (Ti) or tungsten (w) from the top and the bottom may be used, for example. However, the present invention is not limited thereto. The electrode layer 125A and the electrode layer 125B are respectively connected to the source area and the drain area in the semiconductor layer 121 through openings created in the first insulation layer 124.

It should be noted that a base layer 113 may be provided between the switching elements 120 and the second substrate 111 in order to prevent ions such as Na and K from mixing into the semiconductor layer 121 or the gate insulating layer 122 from the second substrate 111. The base layer 113 has a multilayer structure where a layer made of SiNx or the like and a layer made of SiOx or the like are layered in the stated order from the second substrate 111 side.

An insulating layer 127 is provided on top of the switching elements 120. This insulating layer 127 functions to flatten the surface over steps due to the switching elements 120, wiring and the like. It is desirable to use a material that can form a layer in a solution state in order to flatten the surface over steps. Accordingly, an organic substance based material or an inorganic material that is dispersed in a solvent so that film formation becomes possible through coating can be used for the insulating layer 127. In addition, the insulating layer 127 transmits light from the backlight efficiently, and therefore a transparent material that seldom absorbs visible light is desirable. Accordingly, an organic material such as a photosensitive polyimide or acrylate resin is desirable for the insulating film 127.

A common electrode 130 is formed on the insulating layer 127. An insulating film 140 is formed on the common electrode 130, and further a pixel electrode 150 is formed on the insulating film 140. The insulating film 140 may be formed of an insulating material transparent to visible light, and a transparent resin material such as a polyimide resin material or an acrylate resin material or a transparent inorganic material such as oxide silicon (SiOx) or nitride silicon (SiNx) can be used. It is desirable for the pixel electrode 150 to be formed of a transparent conductive material, and it is preferable to use indium tin oxide (ITO), for example, in the same manner for the common electrode 130, and other transparent conductive materials such as indium zinc oxide (InZnO) may also be used. In addition, the pixel electrode 150 is connected to the electrode layer 125A that forms the switching element 120 via the opening (through-hole) 195 that penetrates through the insulating film 140, the common electrode 130, the insulating layer 127, and the second insulation layer 126. The through hole 195 is directly filled in with the same conductive material as that of the pixel electrode 150. Alternatively, an inner layer (not shown) may be provided in order to improve connection between the electrode layer 125A and the electrode material that forms the pixel electrode 150.

It should be noted that the common electrode 130 is provided with an opening in a location corresponding to the through-hole 195, the opening being made large enough to avoid contact with the pixel electrode 150, so that the common electrode may be completely separated, via the insulating layer 127, from the pixel electrode 150.

Figure 8:
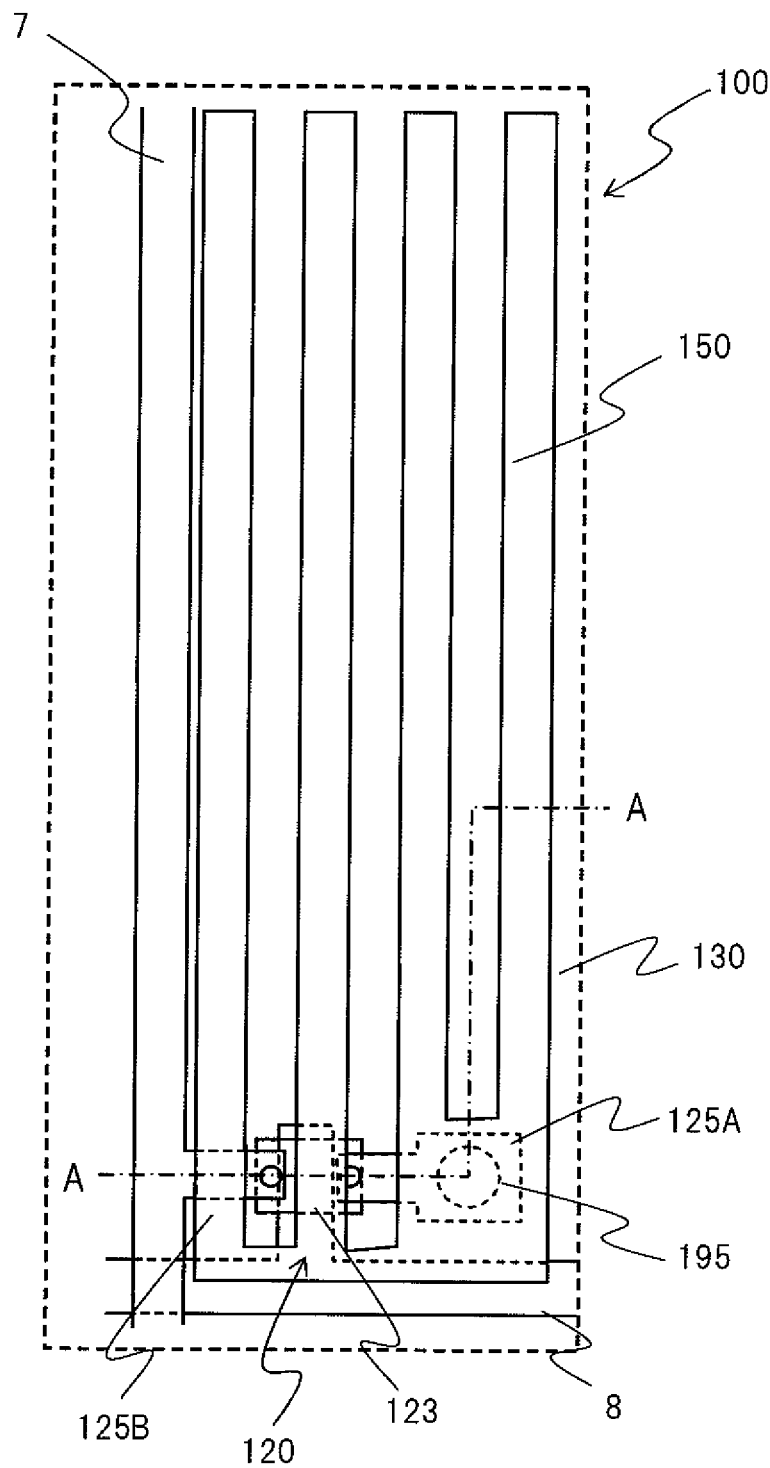
FIG. 8 is a plan view schematically illustrating a configuration of a main part of the sub pixel of the liquid crystal display panel according to the first embodiment.
Figure 9:
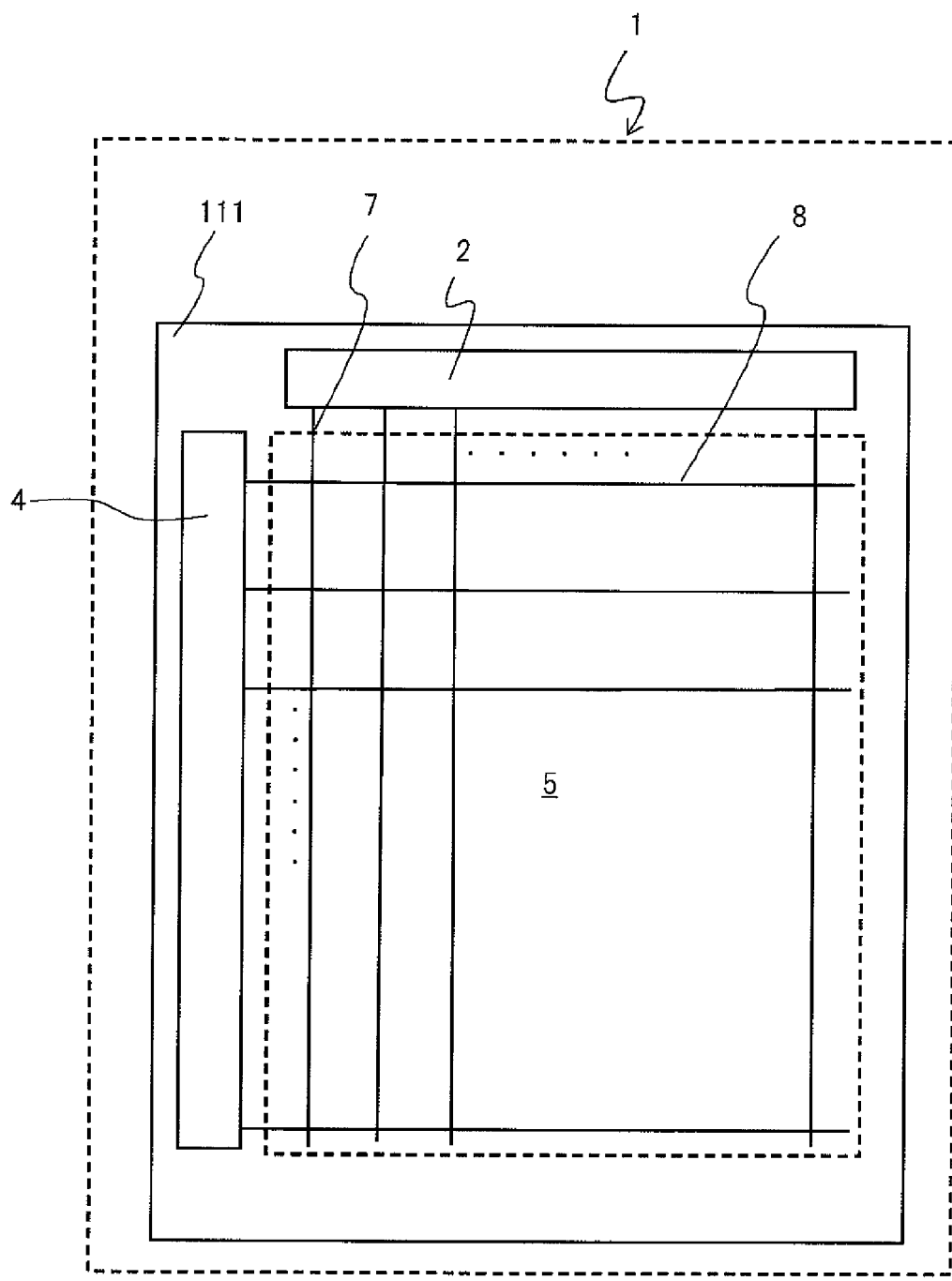
FIG. 9 is a block diagram schematically illustrating an overall layout in the liquid crystal display panel according to the first embodiment.

FIG. 8 is a plan view schematically illustrating a configuration of a main part of the sub pixel 100 of the liquid crystal display panel 1 according to the first embodiment. As illustrated in FIG. 8, the pixel electrode 150 is formed in a comb shape. Further, as illustrated in FIG. 7, the electrode layer 125B contacts with the data line 7, and the gate electrode 123 contacts with the gate line 8. Alternatively, the data line 7 and the gate line 8 may be extended so as to form the electrode layer 125B and the gate electrode 123, respectively.

Further, on the insulating film 140 and the pixel electrode 150, an alignment layer (not shown in FIG. 7) is formed so as to cover the insulating film 140 and the pixel electrode 150. The alignment layer may be formed of a polyimide polymer or diamond like carbon, as in the case of the alignment layer formed on the first substrate 110.

The surfaces of the first substrate 110 and the second substrate 111, on which the alignment layers are formed, are brought together so as to face each other in such a state that a constant gap is provided by means of spacers (not shown) and the periphery is adhered with a frame-shaped seal material so that a space is created inside. The space is filled in with nematic liquid crystal having a positive dielectric anisotropy which is then sealed, to thereby form the liquid crystal layer 160. The direction of alignment of the longitudinal axes of the liquid crystal molecules in the liquid crystal layer 160 is defined as a result of an alignment process carried out on the alignment layers formed on the first substrate 110 and the second substrate 111. The liquid crystal alignment direction in the liquid crystal layer 160 is not twisted between two transparent substrates (first substrate 110 and second substrate 111), which is so-called a homogeneous alignment.

The thickness d of the liquid crystal layer 160 is set so as to provide such conditions that the retardation $\Delta nd$ becomes ½ wavelength when the refractive index anisotropy of the liquid crystal materials is $\Delta n$. In other words, such a thickness d that allows the retardation $\Delta nd$ to be 275 nm with respect to light having a wavelength of 550 nm, for example, may be selected. However, the liquid crystal molecules in the liquid crystal display panel 1 in reality are not uniformly changed in alignment, and hence the retardation $\Delta nd$ of the liquid crystal layer 160 may be set to be slightly larger than ½ wavelength, that is, the thickness d may be appropriately set so that the retardation $\Delta nd$ falls within a range of $275\ nm \leq \Delta nd \leq 400\ nm$ with respect to light having a wavelength of 550 nm, for example, in order to attain brighter display.

Figure 10:
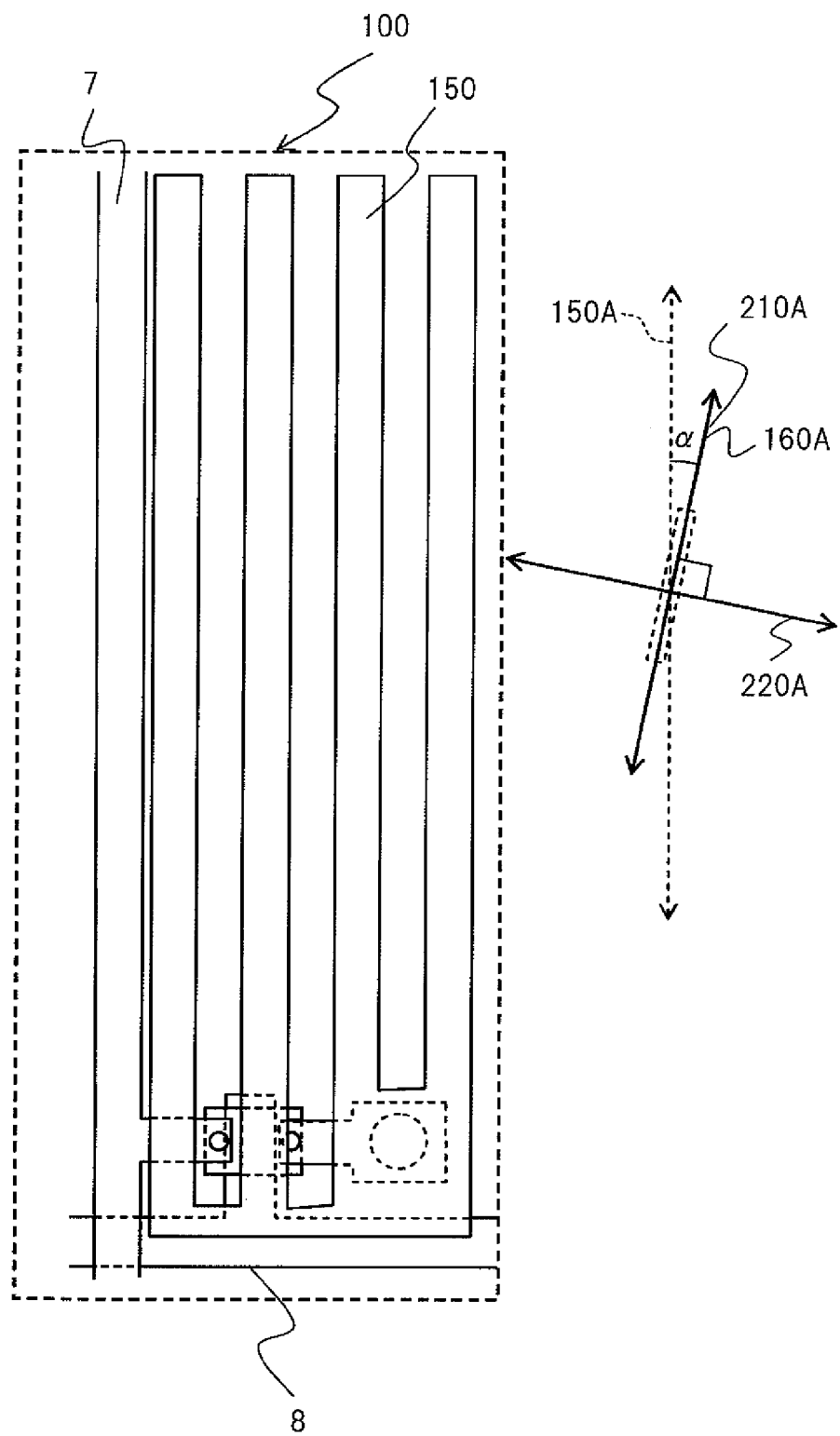
FIG. 10 is an explanatory diagram illustrating an exemplary relation among an absorption axis of linearly polarized light of a first polarizer, an absorption axis of linearly polarized light of a second polarizer, a direction of alignment of the longitudinal axes of liquid crystal molecules in a liquid crystal layer, and a longitudinal direction of a pixel electrode, according to the first embodiment.

FIG. 10 is an explanatory diagram illustrating an exemplary relation among an absorption axis 210A of linearly polarized light in the first polarizer 210, an absorption axis 220A of linearly polarized light of the second polarizer 220, a direction of alignment 160A of the longitudinal axes of liquid crystal molecules in the liquid crystal layer 160, and a longitudinal direction 150A of the pixel electrode 150. In the first embodiment, a first polarization member and a second polarization member are arranged so that the liquid crystal layer 160 is sandwiched therebetween and the absorption axes thereof are orthogonal to each other, the first polarization member and the second polarization member being formed of the first polarizer 210 and the second polarizer 220, respectively.

In the IPS system employed in the first embodiment, the direction of alignment (liquid crystal alignment direction) 160A of the longitudinal axes of liquid crystal molecules in the liquid crystal layer 160 is inclined at an angle $\alpha$ with respect to the longitudinal direction 150A of the pixel electrode 150. The angle $\alpha$ may be set within a range of from ±5 to ±30 degrees, and may desirably be set within a range of from ±7 to ±15 degrees in view of the stability of alignment and brightness of display. The absorption axis 210A of the first polarizer 210 and the absorption axis 220A of the second polarizer 220 are orthogonal to each other, and the direction of alignment (liquid crystal alignment direction) 160A of the liquid crystal layer 160 is made parallel or orthogonal to the absorption axis 210A of the first polarizer 210.

Here, as illustrated in FIG. 10, the longitudinal direction 150A of the pixel electrode 150 is in parallel to the direction (extending direction) in which the data line 7 extends, and the absorption axis 210A of the first polarizer 210 and the liquid crystal alignment direction 160A are both inclined at the angle α (for example, 15 degrees) with respect to the longitudinal direction 150A of the pixel electrode 150. Further, the absorption axis 220A of the second polarizer 220 is orthogonal to both the absorption axis 210A of the first polarizer 210 and the liquid crystal alignment direction 160A.

Figure 11:
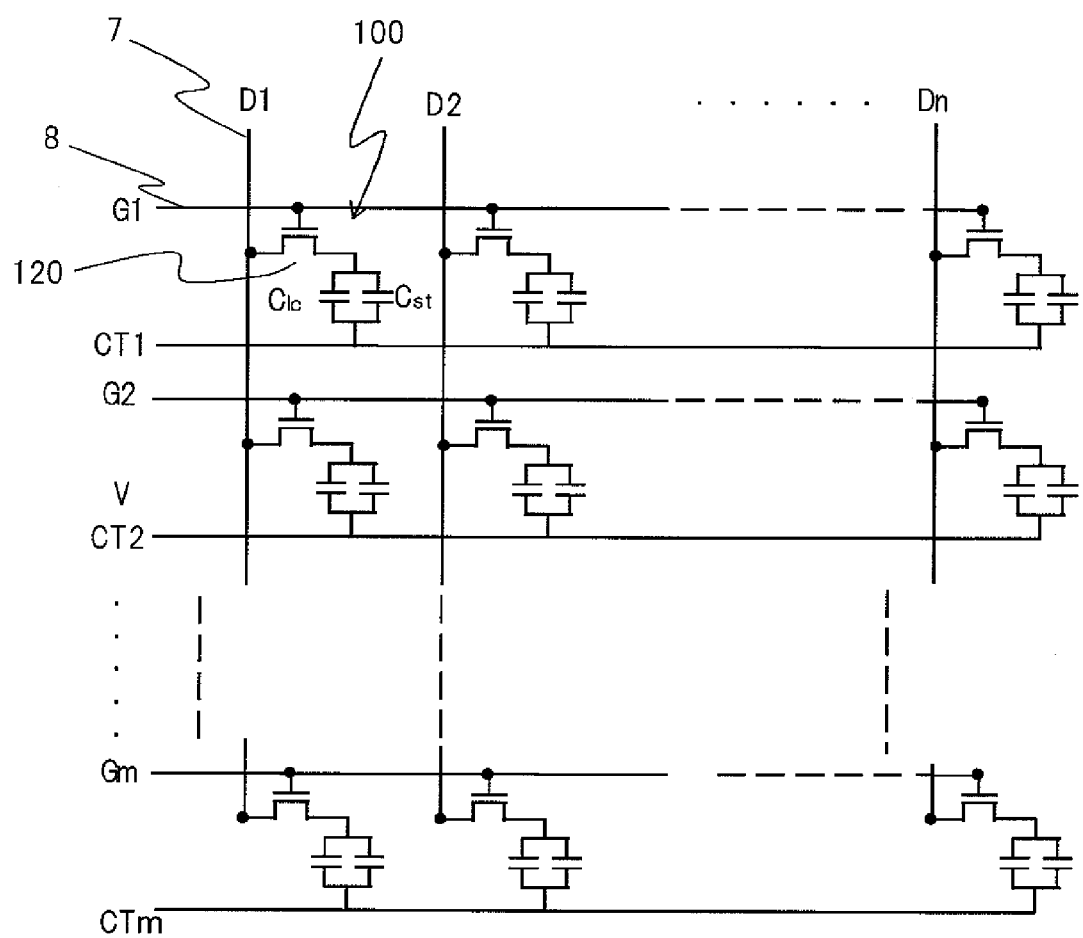
FIG. 11 is an equivalent circuit diagram of an active matrix formed in a display area of the liquid crystal display panel according to the first embodiment.

FIG. 11 is an equivalent circuit diagram of an active matrix formed in a display area 5 of the liquid crystal display panel 1 according to the first embodiment. The liquid crystal display panel 1 is provided with a plurality of gate lines 8 and a plurality of data lines 7, which extend in the direction crossing the direction in which the gate lines 8 extend, in the same manner as in conventional active matrix driver type liquid crystal display panels, and as illustrated in FIG. 11, the sub pixels 100 are provided in matrix at intersections between m gate lines G1, G2, . . . , Gm and n data lines D1, D2, . . . , Dn. In addition, for example, common electrodes may be formed so as to extend in a direction in which the gate lines extend, and are represented as m common electrodes CT1, CT2, . . . , CTm in FIG. 11 for the sake of convenience. Alternatively, m common potential wirings extending in a direction in which the gate lines 8 extend may be provided so as to connect common electrodes, which are formed in individual sub pixels. Still alternatively, the common electrodes may be formed so as to entirely cover the display area except for unnecessary portions such as a through-hole. In any case, the common electrodes are connected so as to be controlled at a predetermined potential.

The sub pixels in the equivalent circuit diagram each include a capacitative element (storage capacitor) Cst formed of a pixel electrode, a common electrode, and the insulating film 140 sandwiched by the electrodes, a capacitative element Clc formed of the liquid crystal layer 160, and the switching device 120.

When the sub pixels are driven, a turn-on voltage is supplied in sequence starting from the gate line G1 in the first row, and this voltage (scanning signal) is supplied in sequence to the gate lines in m rows within one frame period. When a switching element 120 becomes the on state due to the scanning signal, the voltage corresponding to the image signal is supplied from the data line 7 to the pixel electrode via the switching element 120. That is to say, all the switching elements 120 connected to a data line 7 become the on state while the turn-on voltage is being supplied to a certain gate line 8, and the data voltage is supplied to the data lines Dn in n columns in synchronization with this. That is to say, the method for driving the liquid crystal display panel 1 is the same for conventional active matrix driver type liquid crystal display devices employing the IPS system, and therefore the detailed description thereof is omitted.

Figure 12:
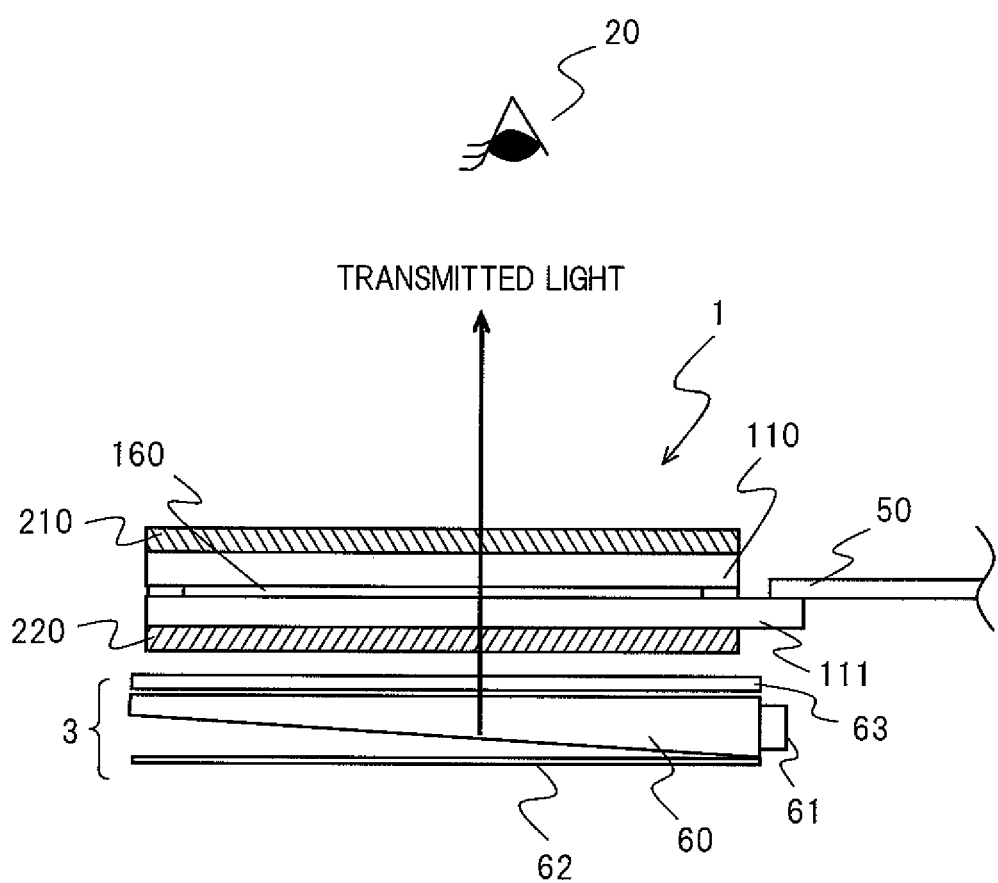
FIG. 12 is a schematic cross sectional diagram illustrating a configuration of a main part of a liquid crystal display device according to the first embodiment.

FIG. 12 is a schematic cross sectional diagram illustrating a configuration of a main part of the liquid crystal display device according to the first embodiment. This liquid crystal display device includes the liquid crystal display panel 1 and the backlight 3 provided in the rear of the liquid crystal display panel.

The liquid crystal display panel 1 has the first substrate 110 and the second substrate 111 as described above.

In general, the second substrate 111 is larger than the first substrate 110 and has a region connected with the outside through image information, such as an image signal, which is an electrical signal in the region of the second substrate ill on the surface on the first substrate 110 side which is not covered with the first substrate 110. That is to say, the liquid crystal display panel 1 is provided with a flexible printed circuit board (FPC) 50 in the region on the second substrate ill where the first substrate 110 does not overlap and is electrically connected to the outside via this FPC 50. In addition, a semiconductor chip (not shown) which functions as a driver may be mounted in this region if necessary.

The backlight 3 illuminates the display area of the liquid crystal display panel 1 from the rear side. The backlight 3 may employ an edge light method (light guide plate method), a direct method (reflective plate method), an area light source method, and the like. An optimal method for the backlight 3 may be selected from among those and other methods depending on the application, purpose and size of the display area. Though a backlight of the edge light method is described here, the present invention is not limited to this.

In this embodiment, the backlight 3 includes: a light guide plate 60 made of a transparent resin where dot printing is performed with white pigment on the rear side or a means for changing the direction in which light travels, which is of a microscopic concavo-convex shape, a lens shape, or the like, is formed; a light source 61 provided on an end surface of the light guide plate 60, a reflective sheet 62 provided on the rear side of the light guide plate 60; and an optical film 63, such as a prism sheet or a diffusion sheet, provided on the front side of the light guide plate 60.

A linear light source, such as a cold-cathode tube or a hot-cathode tube, or a point light source, such as light emitting diodes (LED's) can be used for the light source 61. Though a case where LED's are used for the light source 61 is described hereinbelow, the present invention is not limited to this. In the case where LED's are used for the light source 61, a reflective plate (not shown) may be provided in order for light from the light source to efficiently enter into the light guide plate 60, or the form of the mold resin provided around the light emitting portions of the LED's may be modified.

In this configuration, light emitted from the light source 61 and entering into the light guide plate 60 propagates through the light guide plate 60 while repeating the total reflection. When the light propagating through the light guide plate 60 reaches the means for changing the direction in which light travels provided on the rear side of the light guide plate, the travelling direction changes, and the light is emitted from the front surface side of the light guide plate 60. The distribution of the angles at which the light is emitted from the light guide plate 60 and the in-plane brightness distribution are adjusted by means of the optical film 63, such as a prism sheet or a diffusion sheet, and after that the light illuminates the liquid crystal display panel 1.

The light emitted from the backlight 3 that illuminates the liquid crystal display panel 1 passes through the second polarizer 220, and then passes through the liquid crystal layer 160 so as to enter into the first polarizer 210. At this time, the driving voltage corresponding to the image information sent from an image information generating portion (not shown) is applied to the pixel electrode so that there is a difference in potential between the pixel electrode and the common electrode and an electric field is formed, and thus the direction of alignment the liquid crystal molecules can be changed. This works to change the state of polarization of light that passes through the liquid crystal layer 160, and thus the amount of light that is transmitted through the first polarizer 210 is controlled so that the transmitted light reaches an observer 20.

In the case where the driving voltage is 0 V, that is to say, there is no difference in potential between the pixel electrode 150 and the common electrode 130 so that no electric field is formed, for example, the direction of alignment of the liquid crystal molecules does not change, and thus the state of polarization of the light that passes through the liquid crystal layer 160 is maintained. Therefore, the first polarizer 210 absorbs the light that passes through the liquid crystal layer 160 so that a black (dark) mode is provided. Meanwhile, when a predetermined driving voltage is applied to the pixel electrode 150 so that a predetermined electric field is formed between the pixel electrode 150 and the common electrode 130, the liquid crystal alignment direction changes and the state of polarization of the light that passes through the liquid crystal layer 160 changes. Therefore, the light that passes through the liquid crystal layer 160 and is transmitted through the first polarizer 210 (the multilayer thin film polarizer) in accordance with the degree of change of the state of polarization, and thus the display has a predetermined brightness. That is to say, in the case where the driving voltage is zero, a black (dark) mode is provided, whereas when a predetermined driving voltage is applied, a bright display is provided, and thus the display becomes a so-called normally black type.

Second Embodiment

In the following, a liquid crystal display device according to a second embodiment of the present invention is described with reference to the drawings. In the first embodiment described above, the first polarization member and the second polarization member for transmitting light having polarization directions orthogonal to each other are arranged so as to sandwich the liquid crystal layer 160, in which the first polarizer 210 is disposed on an observer side of the first substrate 110 as the first polarization member, and the second polarizer 220 is disposed on the backlight side of the second substrate 111 as the second polarization member. On the other hand, the second embodiment is different from the first embodiment in that a multilayer thin film polarizer is disposed between the first substrate 110 serving as a color filter substrate and the liquid crystal layer 160. The second embodiment is substantially similar to the first embodiment in other points, and therefore the description thereof is omitted.

Figure 13:
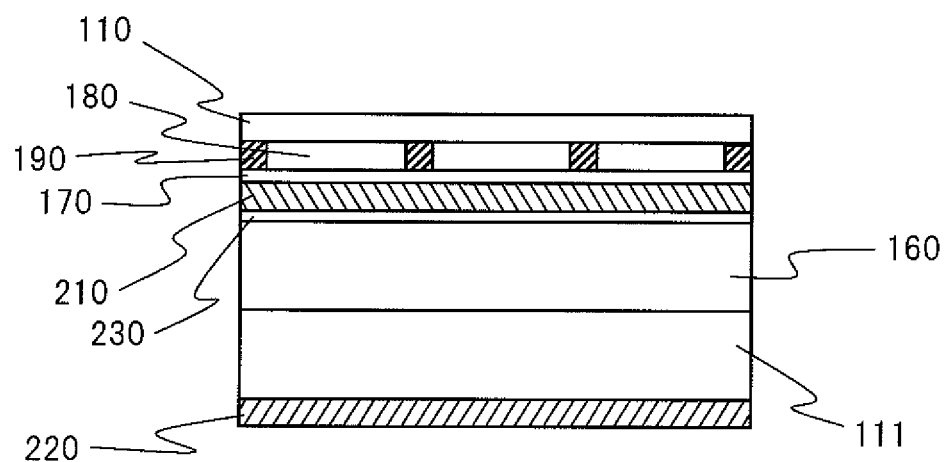
FIG. 13 is a schematic cross sectional diagram illustrating a liquid crystal display panel according to a second embodiment of the present invention.
Figure 14:
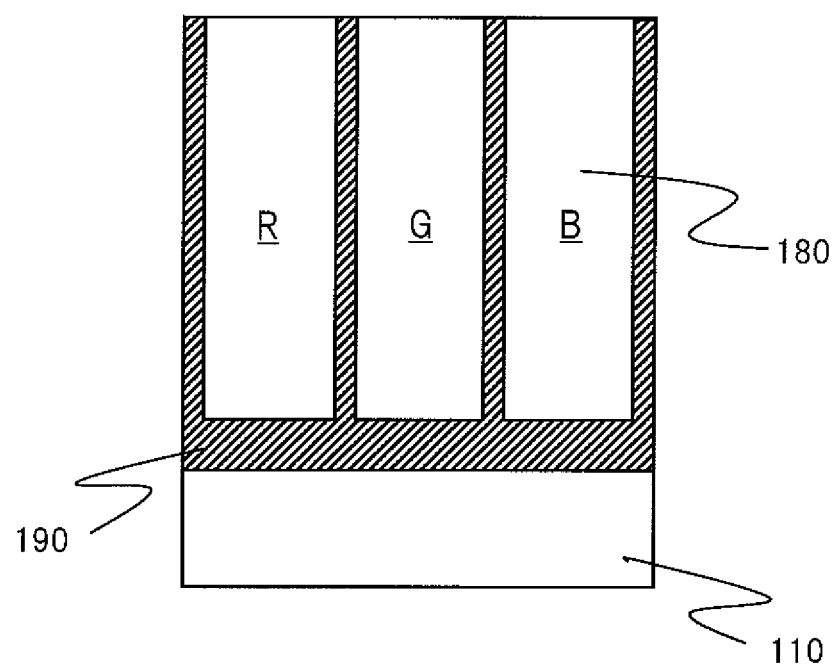
FIG. 14 is a schematic plan view illustrating a first substrate (color filter substrate) according to the second embodiment.

The first polarizer 210 disposed on the first substrate 110 in the second embodiment is described with reference to FIGS. 13 and 14. FIG. 13 is a schematic cross sectional diagram illustrating a liquid crystal display panel according to the second embodiment. FIG. 14 is a schematic plan view illustrating the first substrate (color filter substrate) 110 according to the second embodiment. In the second embodiment, one pixel of the first substrate 110 includes three primary colors of red (R), green (G), and blue (B). As illustrated in FIG. 13, a black matrix 190 is formed on the first substrate 110 by a photo lithography method through coat, pre bake, exposure, image development, rinse, and post bake steps. Though the black matrix 190 of the second embodiment has a film thickness of 1.5 µm, the film thickness may be set in accordance with a black photo-sensitive film to be used so that an optical density substantially equal to or larger than 3 may be attained. Next, a color filter layer 180 is formed by using color photo-sensitive films of the corresponding colors following a photo lithography method through coat, image development, rinse, and post bake steps. In the second embodiment, B is 3.0 µm, G is 2.8 µm, and R is 2.7 µm in film thickness. However, the film thickness may be adjusted as appropriate in accordance with the desired color purity or the thickness of the liquid crystal layer 160. Then, for the purposes of surface flattening and protecting the color filter layer 180, an overcoat layer 170 is formed on the color filter layer 180. The overcoat layer 170 is formed through i-line exposure of 200 mJ/cm2 of a high-pressure mercury lamp and heating at 200° C. for 30 minutes.

Then, on an upper side of the overcoat layer 170 (lower side of FIG. 13), a multilayer thin film polarizer 210 is formed by using the overcoat layer 170 as a substrate, to thereby form the first polarization member between the liquid crystal layer 160 and the color filter layer 180. The multilayer thin film polarizer 210 corresponds to the first polarizer 210 of the first embodiment, and is disposed so that the transmission axes of the multilayer thin film polarizer 210 and the second polarizer 220 are orthogonal to each other. With this configuration, the second polarizer 220 and the multilayer thin film polarizer 210 form a pair to have a function of controlling transmission light transmitted to the observer side from the backlight 3 through the liquid crystal layer 160. The multilayer thin film polarizer 210 employed in the second embodiment includes two layers of thin film polarizers formed of lyotropic liquid crystal, each having a film thickness of about 270 nm to attain excellent orientation. However, there may be employed a multilayer thin film polarizer 210 including two or more thin film polarizers in a film thickness capable of attaining desired contrast and transmittance. Alternatively, the multilayer thin film polarizer 210 may be formed by using any other material. When forming the multilayer thin film polarizer 210, a first layer is subjected to insolubilization processing after being laminated. By subjecting the first layer to the insolubilization processing, dye molecules in the first layer as a lower layer are prevented from becoming out of alignment when another thin film polarizer is stacked thereon. Further, after the first layer is laminated and insolubilized, a second layer is stacked thereon and subjected to insolubilization processing, to thereby prevent the dye molecules in the thin film polarizers from becoming out of alignment which may occur when a protection layer 230 is stacked an upper side of the second layer.

In the second embodiment, the protection layer 230 is formed on an upper side of the multilayer thin film polarizer 210 thus formed. However, the protection layer 230 may be formed when necessary. The protection layer 230 may be desirably formed of a transparent material which is low in absorption of visible light in order to efficiently transmit light from the backlight. Accordingly, an organic material such as a photosensitive polyimide or acrylate resin may preferably be used for the protection layer 230. Further, an alignment layer (not shown in FIG. 13) for rubbing the liquid crystal layer 160 is formed on the protection film 230. The alignment layer for rubbing may be formed of, similarly to the alignment layer formed on the second substrate 111, a polyimide polymer or diamond like carbon.

Next, the surfaces of the first substrate 110 and the second substrate 111, on which the alignment layers are formed, are brought together so as to face each other in such a state that a constant gap is provided by means of spacers (not shown) and the periphery is adhered with a frame-shaped seal material so that a space is created inside. The space is filled in with nematic liquid crystal having a positive dielectric anisotropy, which is then sealed, to thereby form the liquid crystal layer 160.

In the second embodiment, the multilayer thin film polarizer is incorporated as the first polarization member between the liquid crystal layer 160 and the color filter layer 180, to thereby attain high contrast while suppressing a reduction in parallel transmittance, similarly to the first embodiment. Meanwhile, the color filter layer 180 has a depolarization property. In view of this, in the second embodiment, the multilayer thin film polarizer 210 is disposed closer to the liquid crystal layer 160 side than the first substrate 110 on which the color filter layer 180 is formed, to thereby prevent transmission light to be provided to the observer through the liquid crystal layer 160 from being affected by the depolarization effect exerted by the color filter layer 180, leading to a further increase in contrast and transmittance.

It should be noted that, in the second embodiment, the second polarizer 220 is formed as a second polarization member including a multilayer thin film polarizer as in the first embodiment. However, the second polarizer 220 may be formed of a polarizer formed by drawing iodine.

In the second embodiment, a multilayer thin film polarizer is formed above the first substrate 110, by using the overcoat layer 170 of the first substrate 110 as a substrate. In the second embodiment, the overcoat layer 170 is not imparted with an alignment force. However, the overcoat layer 170 may be imparted with an alignment force.

Third Embodiment

Next, a liquid crystal display device according to a third embodiment of the present invention is described with reference to the drawings. In the first and second embodiments described above, the first polarizer 210 including a multilayer thin film polarizer is provided, or the multilayer thin film polarizer 210 which corresponds to the first polarizer 210 is provided, as the first polarization member. The third embodiment is different from the first and second embodiments in that a first supplementary polarizer 13A and an alignment layer 14A are further provided between the first polarizer 210 provided on the observer side of the first substrate 110 and the first substrate 110. In other words, in the third embodiment, the first polarization member is formed by including the first polarizer 210, the first supplementary polarizer 13A, and the alignment layer 14A, and the first supplementary polarizer 13A includes the multilayer thin film polarizer. It should be noted that, in the third embodiment, the first polarizer 210 and the second polarizer 220 are formed by drawing iodine, however, the first polarizer 210 and the second polarizer 220 may be formed by including a multilayer thin film polarizer in which a plurality of thin film polarizers are laminated by coating with dye such as lyotropic liquid crystal.

Figure 15:
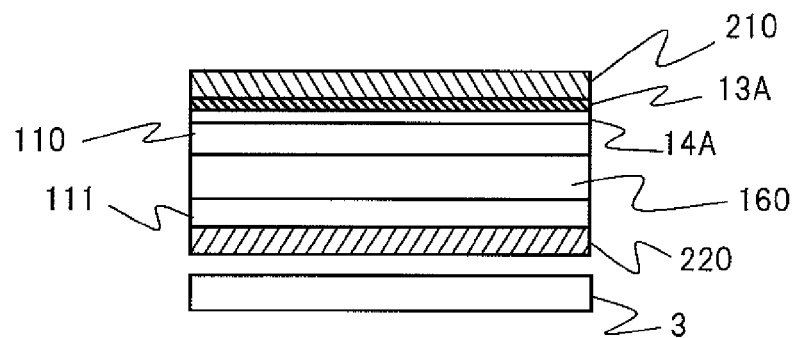
FIG. 15 is a schematic cross sectional diagram illustrating a liquid crystal display device according to a third embodiment of the present invention.
Figure 16:
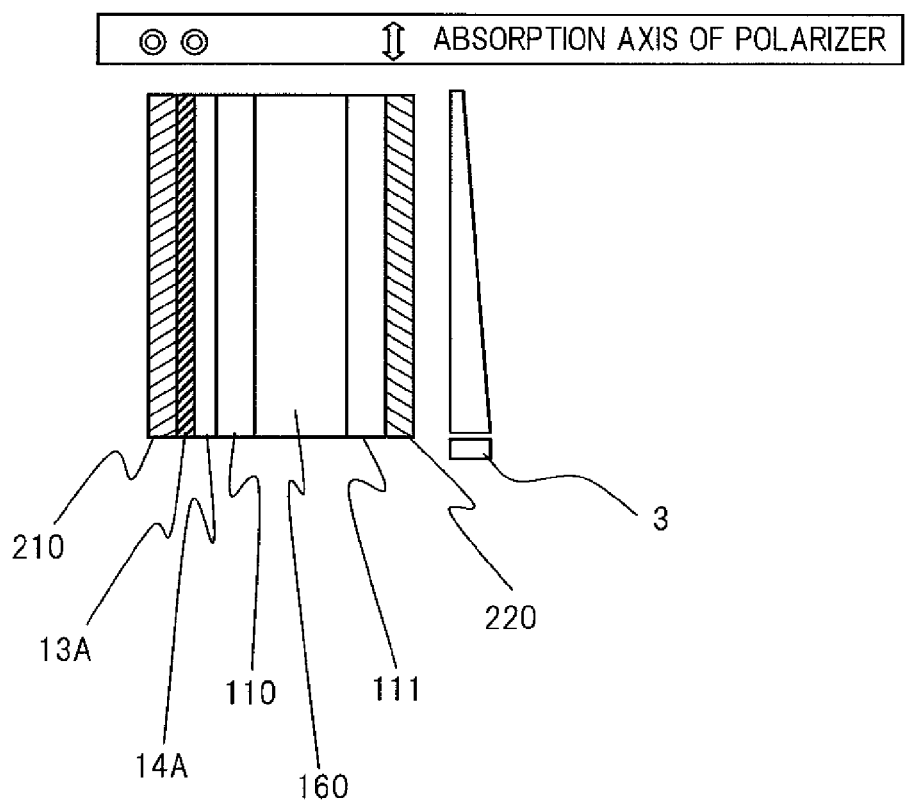
FIG. 16 is an explanatory diagram illustrating a first polarizer and a second polarizer of the liquid crystal display device according to the third embodiment, and further illustrating an absorption axis of a first supplementary polarizer.

FIG. 15 is a schematic cross sectional diagram illustrating the liquid crystal display device according to the third embodiment. FIG. 16 is an explanatory diagram illustrating the liquid crystal display device according to the third embodiment, and illustrating an absorption axis of the first polarizer 210, the second polarizer 220 and, the first supplementary polarizer 13A. As illustrated in FIG. 15, the alignment layer 14A and the first supplementary polarizer 13A are formed on the observer side of the first substrate 110. The alignment layer 14A is formed on the first substrate 110, and the first supplementary polarizer 13A is formed on the alignment layer 14A that has been subjected to an alignment process. The alignment layer 14A may be formed of, similarly to the alignment layer (not shown) for rubbing the liquid crystal layer 160 formed above the first substrate 110, a polyimide polymer or diamond like carbon. Alternatively, the alignment layer 14A may be formed of a material which may be imparted with an alignment function under light exposure.

Further, as illustrated in FIG. 16, the first supplementary polarizer 13A is formed so that the absorption axis thereof becomes substantially orthogonal to the absorption axis of the second polarizer 220. Further, the first supplementary polarizer 13A of the third embodiment is formed of lyotropic liquid crystal, and hence the first supplementary polarizer 13A is subjected to insolubilization processing, to thereby stabilize the dye in the first supplementary polarizer 13A. Further, the first polarizer 210 is directly attached to the first supplementary polarizer 13A. The absorption axes of the first polarizer 210 and the first supplementary polarizer 13A are substantially in parallel to each other.

Next, the reason of providing the first supplementary polarizer 13A in the third embodiment is described below. When the liquid crystal display device which includes a pair of polarizers is observed from an oblique direction, the absorption axis of the first polarizer 210 and the transmission axis of the second polarizer 220 are misaligned. Due to the axis misalignment, light leakage occurs, which reduces the contrast when viewed from the oblique direction as compared to a case when viewed from the front. To solve the problem, it is effective to provide the first supplementary polarizer 13A between the first polarizer 210 and the second polarizer 220. In this case, an E-type polarizer may desirably be used for the first supplementary polarizer 13A. When the first supplementary polarizer 13A is provided, the misalignment of the transmission axis of the second polarizer 220 and the absorption axis of the first supplementary polarizer 13A may be improved. In other words, light leakage in the oblique direction may be suppressed, to thereby increase the view angle. The same applies to a fourth embodiment of the present invention.

Figure 17:
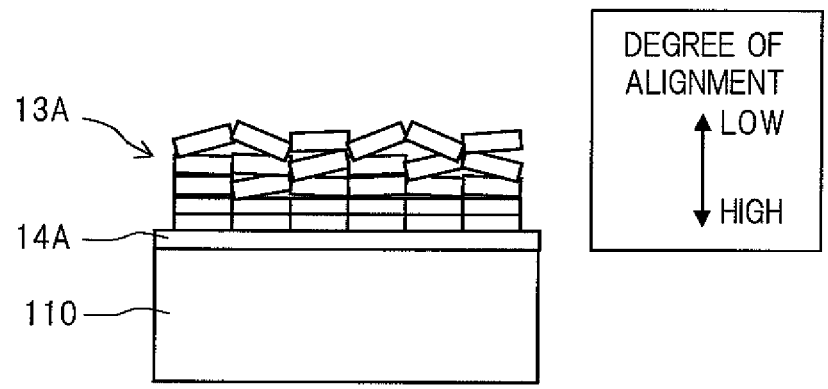
FIG. 17 illustrates an alignment model of dye molecules in a thin film polarizer coated on an alignment layer having an alignment force.

The alignment layer 14A may desirably be formed between the liquid crystal layer 160 and the supplementary polarizer 13A. Further, the alignment layer 14A in the third embodiment is disposed between the first substrate 110 and the first supplementary polarizer 13A. FIG. 17 illustrates an alignment model of dye molecules in a thin film polarizer coated on an alignment layer having an alignment force. As illustrated in FIG. 17, in the first supplementary polarizer 13A, dye molecules in the thin film layer formed on the alignment layer 14A becomes further out of alignment as the distance from the alignment layer 14A increases in the film thickness direction. When the alignment layer 14A is disposed between the first substrate 110 and the first supplementary polarizer 13A as in the configuration according to the third embodiment, polarized light emitted from the liquid crystal layer 160 enters the first supplementary polarizer 13A from the alignment layer 14A side and passes through the first supplementary polarizer 13A in the film thickness direction. At this time, due to the dye molecules being out of alignment in the first supplementary polarizer 13A, the polarization is distorted when the light exits the first supplementary polarizer 13A. Of light scattered in all directions, the light scattered in a direction of the absorption axis of the first polarizer 210 is absorbed by the absorption axis of the first polarizer 210, and hence substantially linearly polarized light may be obtained. In other words, the scattering of light caused by the dye molecules being out of alignment in the first supplementary polarizer 13A may be suppressed by the alignment layer 14A disposed between the first substrate 110 and the first supplementary polarizer 13A. Accordingly, when the first supplementary polarizer 13A is provided, the reduction in front contrast may also be suppressed while suppressing a reduction in contrast when the liquid crystal display device is viewed from the oblique direction.

As a comparison to the liquid crystal display device according to the third embodiment described above, a liquid crystal display device is manufactured as Comparative Example 1 which is substantially similar in configuration to the third embodiment, except in that the first supplementary polarizer 13A is provided on the first polarizer 210 side relative to the first substrate 110, and the alignment layer 14A is provided between the first polarizer 210 and the first supplementary polarizer 13A. That is, the positions of the alignment layer 14A and the first supplementary polarizer 13A are inverted between Comparative Example 1 and the third embodiment. The orthogonal transmittance was measured for each of the liquid crystal display devices of Comparative Example 1 and the third embodiment, and a relative orthogonal transmittance in Comparative Example 1 was 1.0 while 0.5 in the third embodiment. This confirmed that the configuration according to the third embodiment is capable of suppressing scattering of light and a reduction in front contrast. Accordingly, in the liquid crystal display device according to the third embodiment, the scattering of light is suppressed as compared to the liquid crystal display device of Comparative Example 1, to thereby suppress a reduction in front contrast.

Fourth Embodiment

In the third embodiment described above, the first supplementary polarizer 13A and the alignment layer 14A are formed on the observer side of the liquid crystal layer 160. The fourth embodiment of the present invention is different from the third embodiment in that a second supplementary polarizer 13B and an alignment layer 14B are formed on the backlight side. Specifically, in the fourth embodiment, the second polarization member is formed by including the second polarizer 220, the second supplementary polarizer 13B, and the alignment layer 14B, and the second supplementary polarizer 13B includes the multilayer thin film polarizer. It should be noted that the first polarizer 210 and the second polarizer 220 of the fourth embodiment are formed by drawing iodine, however, the first polarizer 210 and the second polarizer 220 may be formed by including a multilayer thin film polarizer in which a plurality of thin film polarizers are stacked by coating with dye such as lyotropic liquid crystal. The fourth embodiment is substantially similar to the third embodiment in other points, and therefore the description of the same points is omitted.

Figure 18:
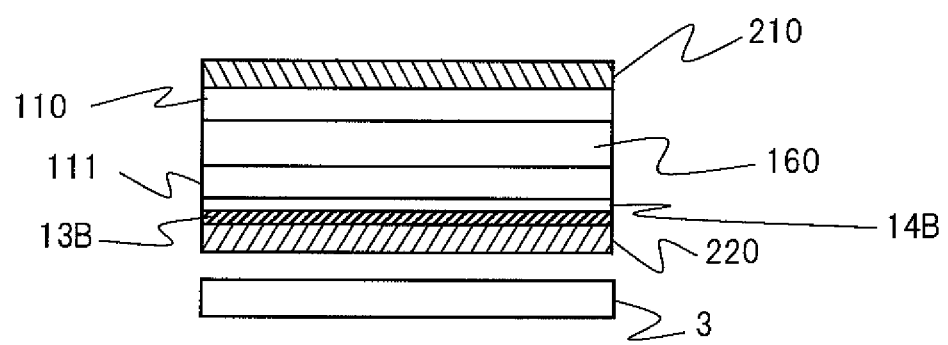
FIG. 18 is a schematic cross sectional diagram illustrating a liquid crystal display device according to a fourth embodiment of the present invention.
Figure 19:
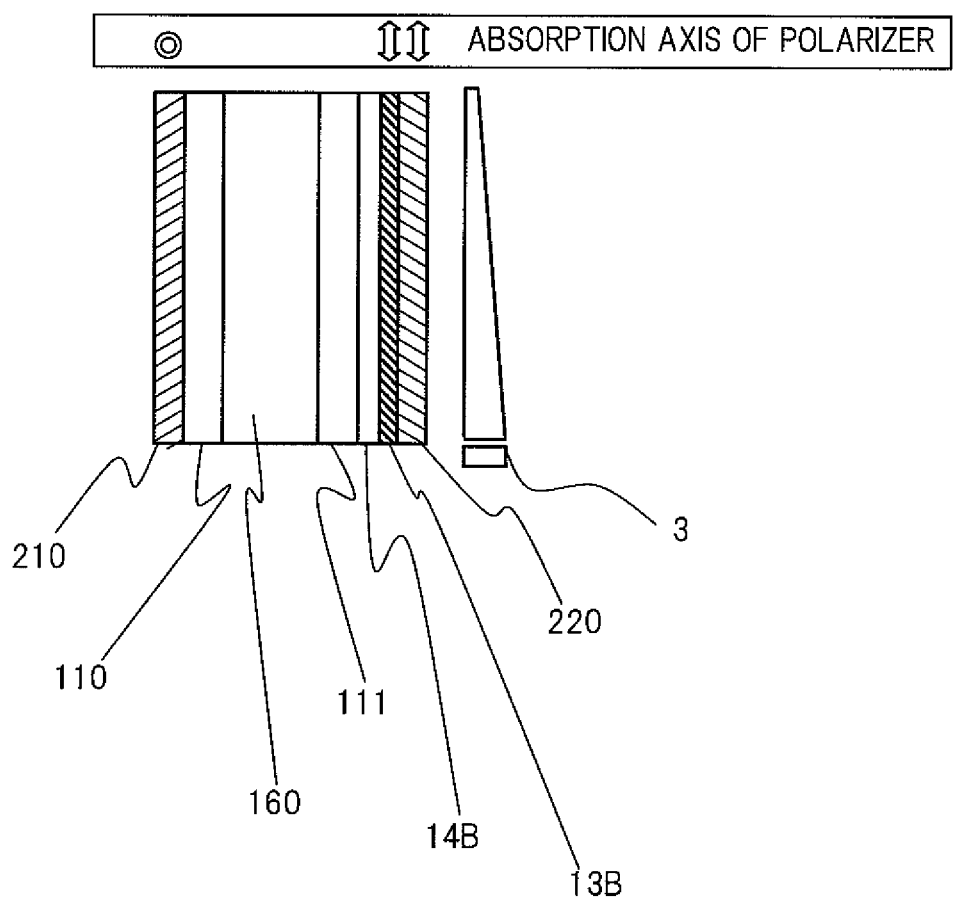
FIG. 19 is an explanatory diagram illustrating a first polarizer and a second polarizer of the liquid crystal display device according to the fourth embodiment, and further illustrating an absorption axis of a second supplementary polarizer.

FIG. 18 is a schematic cross sectional diagram illustrating a liquid crystal display panel according to the fourth embodiment. FIG. 19 is an explanatory diagram illustrating the liquid crystal display device according to the fourth embodiment and further illustrating an absorption axis of the first polarizer 210, the second polarizer 220 and the second supplementary polarizer 13B. As illustrated in FIG. 18, the alignment layer 14B and the second supplementary polarizer 13B are formed on the backlight side of the second substrate 111. The alignment layer 14B is formed on the second substrate 111, and the second supplementary polarizer 13B is formed on the alignment layer 14B that has been subjected to an alignment process. The alignment layer 14B may be formed of, similarly to the alignment layer (not shown) for rubbing the liquid crystal layer 160 formed above the second substrate 111, a polyimide polymer or diamond like carbon. Alternatively, the alignment layer 14B may be formed of a material which may be imparted with an alignment function under light exposure.

Further, as illustrated in FIG. 19, the second supplementary polarizer 13B is formed so that the absorption axis thereof becomes substantially orthogonal to the absorption axis of the first polarizer 210. Further, the second supplementary polarizer 13B of the fourth embodiment is formed of lyotropic liquid crystal, and hence the second supplementary polarizer 13B is subjected to insolubilization processing, to thereby stabilize the dye in the second supplementary polarizer 13B. Further, the second polarizer 220 is directly attached to the second supplementary polarizer 13B. The absorption axes of the second polarizer 220 and the second supplementary polarizer 13B are substantially in parallel to each other.

The alignment layer 14B in the fourth embodiment is disposed between the second substrate 111 and the second supplementary polarizer 13B. When the alignment layer 14B is disposed between the second substrate 111 and the second supplementary polarizer 13B as in the fourth embodiment, light emitted from the backlight 3 becomes substantially linearly polarized due to the second polarizer 220 and passes through the second supplementary polarizer 13B. At this time, the linearly polarized light entering the second supplementary polarizer 13B is distorted in polarization at portions distant from the alignment layer 14B in the film thickness direction. Of light scattered in all directions, the light scattered in a direction of the absorption axis of the second supplementary polarizer 13B is absorbed by the second supplementary polarizer 13B, and hence light exiting from the second supplementary polarizer 13B becomes substantially linearly polarized. In other words, the scattering of light caused by the dye molecules being out of alignment in the second supplementary polarizer 13B may be suppressed. Accordingly, when the second supplementary polarizer 13B is provided, the reduction in front contrast may also be suppressed while suppressing a reduction in contrast when the liquid crystal display device is viewed from the oblique direction.

As a comparison to the liquid crystal display device according to the fourth embodiment described above, a liquid crystal display device is manufactured as Comparative Example 2 which is substantially similar in configuration to the fourth embodiment, except in that the second supplementary polarizer 13B is provided on the second polarizer 220 side relative to the second substrate 111, and the alignment layer 14B is provided between the second polarizer 220 and the second supplementary polarizer 13B. That is, the positions of the alignment layer 14B and the second supplementary polarizer 13B are inverted between Comparative Example 2 and the fourth embodiment. The orthogonal transmittance was measured for each of the liquid crystal display devices of Comparative Example 2 and the fourth embodiment, and a relative orthogonal transmittance in Comparative Example 2 was 1.0 while 0.5 in the fourth embodiment. This confirmed that the configuration according to the fourth embodiment is capable of suppressing scattering of light and a reduction in front contrast. Accordingly, in the liquid crystal display device according to the fourth embodiment, the scattering of light is suppressed as compared to the liquid crystal display device of Comparative Example 2, to thereby suppress a reduction in front contrast.

Fifth Embodiment

Next, a liquid crystal display device according to a fifth embodiment of the present invention is described with reference to the drawings. In the third embodiment described above, the first supplementary polarizer 13A and the alignment layer 14A are additionally provided between the first polarizer 210 disposed on the observer side of the first substrate 110 and the first substrate 110. The fifth embodiment is different from the third embodiment in that the first polarizer 210 is provided on the observer side of the first substrate 110 and a first supplementary polarizer 13C is further provided on the observer side of the first polarizer 210. Specifically, in the fifth embodiment, the first polarization member is formed by including the first polarizer 210 and the first supplementary polarizer 13C, and the first supplementary polarizer 13C includes the multilayer thin film polarizer. It should be noted that the first polarizer 210 and the second polarizer 220 of the fifth embodiment are formed by drawing iodine, but the first polarizer 210 and the second polarizer 220 may be formed by including a multilayer thin film polarizer in which a plurality of thin film polarizers are stacked by coating with dye such as lyotropic liquid crystal. The fifth embodiment is substantially similar to the third embodiment in other points, and therefore the description of the same points is omitted.

Figure 20:
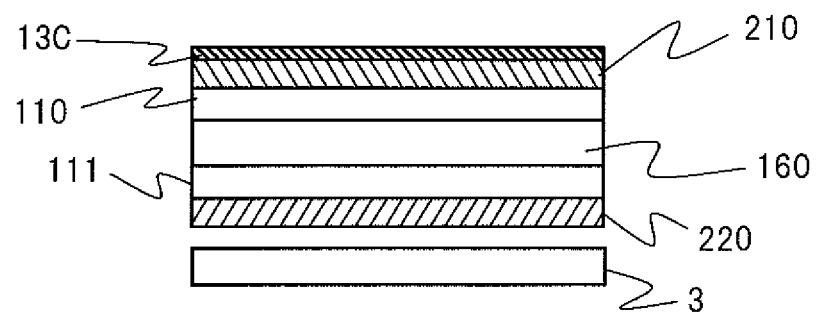
FIG. 20 is a schematic cross sectional diagram illustrating a liquid crystal display device according to a fifth embodiment of the present invention.
Figure 21:
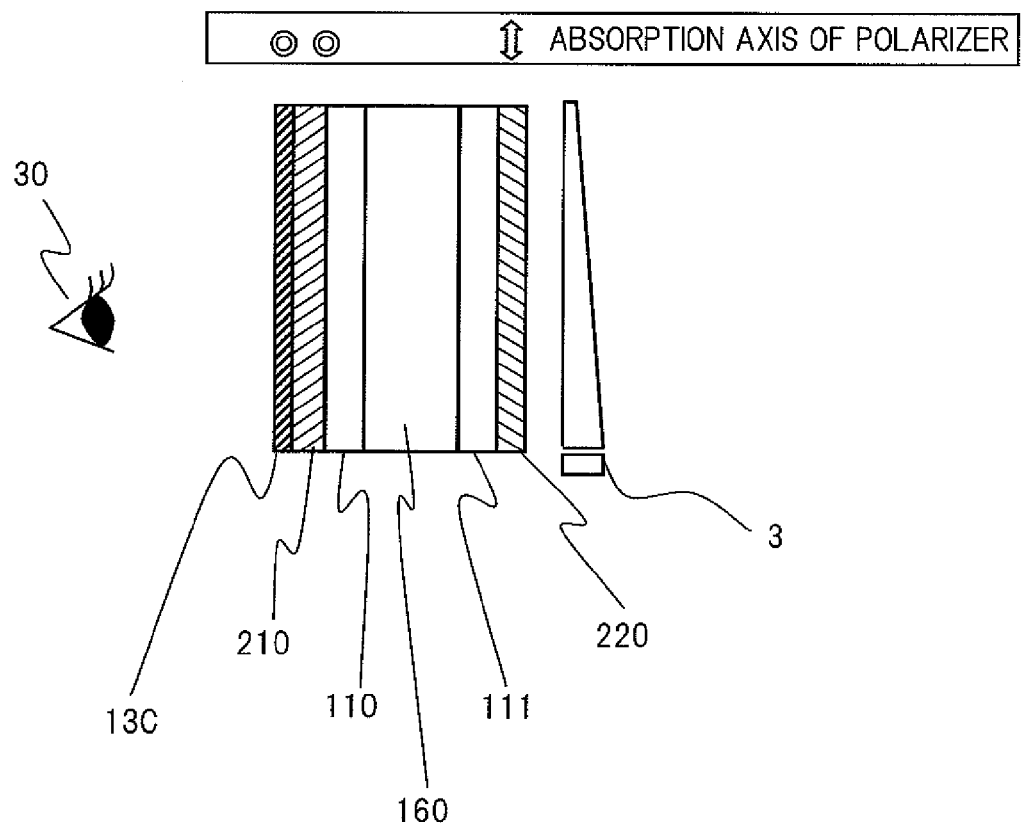
FIG. 21 is an explanatory diagram illustrating a first polarizer and a second polarizer of the liquid crystal display device according to the fifth embodiment, and further illustrating an absorption axis of a first supplementary polarizer.

FIG. 20 is a schematic cross sectional diagram illustrating the liquid crystal display device according to the fifth embodiment. FIG. 21 is an explanatory diagram illustrating the liquid crystal display device according to the fifth embodiment, and further illustrating an absorption axis of the first polarizer 210, the second polarizer 220 and the first supplementary polarizer 13C. As illustrated in FIG. 20, the first supplementary polarizer 13C is disposed on a surface of the first polarizer 210 on the observer side of the liquid crystal cell 15. The first supplementary polarizer 13C is directly formed on the first polarizer 210. A protection layer may be formed on a surface of the first supplementary polarizer 13C when necessary. The protection layer may desirably be formed of a transparent material which is low in absorption of visible light in order to efficiently transmit light from the backlight. Accordingly, an organic material such as a photosensitive polyimide or acrylate resin may preferably used for the protection layer.

Further, as illustrated in FIG. 21, the first polarizer 210 and the second polarizer 220 are disposed so that the absorption axes thereof are substantially orthogonal to each other. Still further, the first supplementary polarizer 13C is formed so that the absorption axis thereof is substantially parallel to the absorption axis of the first polarizer 220. An alignment layer is not provided below the first supplementary polarizer 13C, and therefore the dye molecules are aligned by a shear stress to be uniformly oriented in the film thickness direction. Accordingly, linear polarization of light emitted from the first polarizer 210 is distorted when the light enters the first supplementary polarizer 13C due to the out of alignment uniformly caused in the film thickness direction. However, even if the polarization is distorted due to the out of alignment in the first supplementary polarizer 13C, the distortion hardly affects a display image to be provided to an observer 30. Accordingly, when the first supplementary polarizer 13C is formed on the surface of the first polarizer 210, a high front contrast may be attained without being affected by the scattering of light.

Sixth Embodiment

Next, a liquid crystal display device according to a sixth embodiment of the present invention is described with reference to the drawings. In the fourth embodiment described above, the second supplementary polarizer 13B and the alignment layer 14B are additionally provided between the second polarizer 220 disposed on the backlight 3 side of the second substrate 111 and the second substrate 111. On the other hand, the sixth embodiment is different from the fourth embodiment in that a second supplementary polarizer 13D is additionally disposed on the backlight 3 side of the second polarizer 220 disposed on the backlight 3 side of the second substrate 111. In other words, in the sixth embodiment, the second polarization member is formed by including the second polarizer 220 and the second supplementary polarizer 13D, and the second supplementary polarizer 13D includes the multilayer thin film polarizer. It should be noted that, in the sixth embodiment, the first polarizer 210 and the second polarizer 220 are formed by drawing iodine, but the first polarizer 210 and the second polarizer 220 may be formed by including a multilayer thin film polarizer in which a plurality of thin film polarizers are laminated by coating with dye such as lyotropic liquid crystal. The sixth embodiment is substantially similar to the fourth embodiment in other points, and therefore the description of the same points is omitted.

Figure 22:
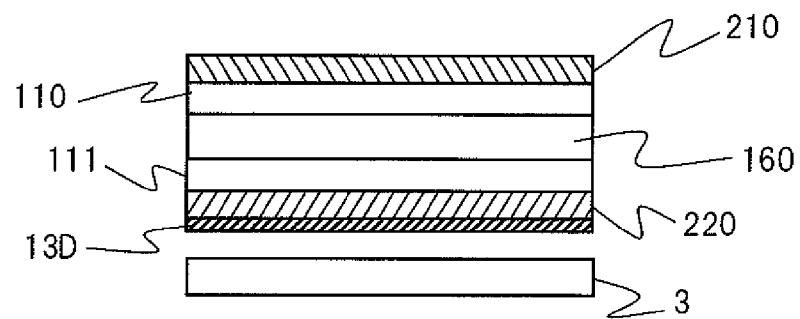
FIG. 22 is a schematic cross sectional diagram illustrating a liquid crystal display device according to a sixth embodiment of the present invention.

FIG. 22 is a schematic cross sectional diagram illustrating the liquid crystal display device according to the sixth embodiment. FIG. 23 is an explanatory diagram illustrating the liquid crystal display device according to the sixth embodiment, and further illustrating an absorption axis of the first polarizer 210, the second polarizer 220 and the second supplementary polarizer 13D. As illustrated in FIG. 22, the second supplementary polarizer 13D is disposed on a surface of the second polarizer 220 on the backlight 3 side of the liquid crystal cell 15. The second supplementary polarizer 13D is directly formed on the second polarizer 220. A protection layer may be formed on a surface of the second supplementary polarizer 13D when necessary. The protection layer may desirably be formed of a transparent material which is low in absorption of visible light in order to efficiently transmit light from the backlight 3. Accordingly, an organic material such as a photosensitive polyimide or acrylate resin may preferably used for the protection layer.

Further, as illustrated in FIG. 23, the first polarizer 210 and the second polarizer 220 are disposed so that the absorption axes thereof are substantially orthogonal to each other. Still further, the second supplementary polarizer 13D is formed so that the absorption axis thereof is substantially parallel to the absorption axis of the second polarizer 220. An alignment layer is not provided below the multilayer thin film polarizer in the second supplementary polarizer 13D, and therefore, in each thin film polarizer of the multilayer thin film polarizer, the dye molecules are aligned by a shear stress to be uniformly oriented in the film thickness direction. Then, light emitted from the backlight 3 becomes substantially linear polarization due to the absorption axis of the second supplementary polarizer 13D. However, the light is scattered in all directions due to the out of alignment of dye molecules in the second supplementary polarizer 13D. The light thus scattered in all directions becomes linear polarization due to the second polarizer 220 which increases the degree of polarization of the light. Accordingly, the scattering of light in the second supplementary polarizer 13D may have a smaller effect on a display image to be provided to the observer 30. When the second supplementary polarizer 13D is formed on a surface on the backlight 3 side of the second polarizer 220, a high front contrast is attained with an affection of the scattering of light suppressed.

While there have been described what are at present considered to be certain embodiments of the present invention, it will be understood that various modifications may be made thereto, and it is intended that the appended claims cover all such modifications as fall within the true spirit and scope of the present invention.

What is claimed is:

1. A liquid crystal display device, comprising:
a liquid crystal cell including a first substrate disposed on an observer side, a second substrate disposed on a backlight side, and a liquid crystal layer sealed between the first substrate and the second substrate;
a first polarization member for transmitting light in a predetermined polarization direction, the first polarization member being disposed on the observer side relative to the liquid crystal layer; and
a second polarization member for transmitting light in another polarization direction which is orthogonal to the predetermined polarization direction, the second polarization member being disposed on the backlight side relative to the liquid crystal layer, wherein:
at least one of the first polarization member and the second polarization member comprises a multilayer thin film polarizer including a plurality of thin film polarizers which are stacked so that transmission axes of the plurality of thin film polarizers are aligned;
at least one of the plurality of thin film polarizes in the multilayer thin film polarizer comprises a thin film polarizer formed in a predetermined film thickness by coating with dye molecules which are aligned by a shear stress;

the second polarization member includes a second polarizer provided on the backlight side of the second substrate, and a second supplementary polarizer provided so that an absorption axis of the second supplementary polarizer is in parallel to absorption axis second polarizer; and the second polarizer is formed by including the multilayer thin film polarizer.

2. The liquid crystal display device according to claim 1, wherein:

the first polarization member includes a first polarizer provided on the observer side of the first substrate; and at least one of the first polarizer and the second polarizer is formed by including the multilayer thin film polarizer.

3. The liquid crystal display device according to claim 1, wherein:

the first polarization member includes a first polarizer provided on the observer side of the first substrate, and a first supplementary polarizer provided so that an absorption axis of the first supplementary polarizer is in parallel to an absorption axis of the first polarizer; and the first supplementary polarizer is formed by including the multilayer thin film polarizer.

4. The liquid crystal display device according to claim 3, wherein:

the first supplementary polarizer is disposed between the first polarizer and the first substrate; and the first supplementary polarizer and the first substrate sandwich an alignment layer disposed therebetween.

5. The liquid crystal display device according to claim 3, wherein the first supplementary polarizer is disposed on the observer side of the first polarizer as being in contact with the first polarizer.

6. The liquid crystal display device according to claim 1, wherein:

the first substrate includes a color filter layer; and the first polarization member is formed by including the multilayer thin film polarizer, and disposed between the color filter layer and the liquid crystal layer.

7. The liquid crystal display device according to claim 1, wherein:

the second supplementary polarizer is disposed between the second polarizer and the second substrate; and the second supplementary polarizer and the second substrate sandwich an alignment layer disposed therebetween.

8. The liquid crystal display device according to claim 1, wherein the second supplementary polarizer is disposed on the backlight side of the second polarizer as being in contact with the second polarizer.

9. The liquid crystal display device according to claim 1, wherein:

the second substrate has an alignment force;

the multilayer thin film polarizer includes a first thin film polarizer formed by coating with dye molecules which are aligned in a predetermined direction by a shear stress and second thin film polarizer formed on the second substrate by coating with dye molecules which are aligned in the predetermined direction by the alignment force;

the second thin film polarizer is stacked so that the dye molecules are made out of alignment as being away in an upward direction from the second substrate; and the first thin film polarizer is stacked on an upper side of the second thin film polarizer, the first thin film polarizer and the second thin film polarizer being different from each other in out of alignment of dye molecules.

10. The liquid crystal display device according to claim 9, wherein the plurality of thin film polarizers stacked in the multilayer thin film polarizer each have a thickness equal to or smaller than 300 nm.

11. The liquid crystal display device according to claim 10, wherein the plurality of thin film polarizers stacked in the multilayer thin film polarizer each have a thickness which is 100 nm or more and 270 nm or less.

12. The liquid crystal display device according to claim 10, wherein:

the dye molecules in the first thin film polarizer includes lyotropic liquid crystal; and the first thin film polarizer is formed in a film thickness falling within a range of 270 nm±20 nm.

* * * * *